(12) United States Patent
Matsumoto

(10) Patent No.: US 11,518,922 B2
(45) Date of Patent: Dec. 6, 2022

(54) REFRIGERATOR OIL AND COMPOSITION FOR REFRIGERATORS

(71) Applicant: IDEMITSU KOSAN CO., LTD., Chiyoda-ku (JP)

(72) Inventor: Tomoya Matsumoto, Funabashi (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 42 days.

(21) Appl. No.: 16/497,114

(22) PCT Filed: Apr. 11, 2018

(86) PCT No.: PCT/JP2018/015152
§ 371 (c)(1),
(2) Date: Sep. 24, 2019

(87) PCT Pub. No.: WO2018/190354
PCT Pub. Date: Oct. 18, 2018

(65) Prior Publication Data
US 2020/0377776 A1    Dec. 3, 2020

(30) Foreign Application Priority Data

Apr. 12, 2017 (JP) .............................. JP2017-079193

(51) Int. Cl.
| | | |
|---|---|---|
| C09K 5/04 | (2006.01) | |
| C10M 107/24 | (2006.01) | |
| C10M 107/32 | (2006.01) | |
| C10M 107/34 | (2006.01) | |
| F25B 1/00 | (2006.01) | |
| C10N 30/00 | (2006.01) | |
| C10N 40/30 | (2006.01) | |

(52) U.S. Cl.
CPC ........... C09K 5/045 (2013.01); C10M 107/24 (2013.01); C10M 107/32 (2013.01); C10M 107/34 (2013.01); F25B 1/00 (2013.01); *C09K 2205/106* (2013.01); *C09K 2205/12* (2013.01); *C09K 2205/122* (2013.01); *C09K 2205/126* (2013.01); *C09K 2205/132* (2013.01); *C09K 2205/22* (2013.01); *C09K 2205/24* (2013.01); *C10M 2209/043* (2013.01); *C10M 2209/1023* (2013.01); *C10M 2209/1033* (2013.01); *C10N 2030/52* (2020.05); *C10N 2040/30* (2013.01)

(58) Field of Classification Search
CPC .............. C09K 5/045; C09K 2205/126; C09K 2205/22; C10M 2209/043
See application file for complete search history.

(56) References Cited

U.S. PATENT DOCUMENTS

| | | | | |
|---|---|---|---|---|
| 10,266,736 | B2* | 4/2019 | Low .................... | B01D 11/0288 |
| 2005/0145823 | A1 | 7/2005 | Yamada et al. | |
| 2006/0243944 | A1* | 11/2006 | Minor ................ | C10M 171/008 252/67 |
| 2013/0096218 | A1* | 4/2013 | Rached .................. | C09K 5/045 521/170 |
| 2015/0152305 | A1* | 6/2015 | Minor ................... | C09K 5/045 62/77 |
| 2016/0355717 | A1 | 12/2016 | Fukushima et al. | |
| 2017/0097176 | A1* | 4/2017 | Yamashita ............ | F25B 31/002 |
| 2017/0327759 | A1 | 11/2017 | Takahashi et al. | |

FOREIGN PATENT DOCUMENTS

| | | |
|---|---|---|
| CN | 101945980 | 1/2011 |
| EP | 2 243 817 A1 | 10/2010 |
| JP | 2011-195725 A | 10/2011 |
| JP | 2012-52135 A | 3/2012 |
| WO | WO 2013/147048 A1 | 10/2013 |
| WO | WO 2015/125883 A1 | 8/2015 |
| WO | WO 2016/056392 A1 | 4/2016 |

OTHER PUBLICATIONS

International Search Report dated Jun. 19, 2018 in PCT/JP2018/015152 filed on Apr. 11, 2018.
Office Action dated Sep. 15, 2020 in corresponding Japanese Patent Application No. 2017-079193 (with English Translation), 7 pages.
Indian Office Action dated Feb. 11, 2021 in Indian Patent Application No. 201947040891, 6 pages.
Japanese Office Action dated Feb. 24, 2021 in Japanese Patent Application No. 2017-079193 (with unedited computer generated English translation), 5 pages.
Extended European Search Report dated Nov. 27, 2020 in European Patent Application No. 18785151.4, citing document AO therein, 7 pages.
Hearing Notice dated Oct. 29, 2021, in Indian patent Application No. 201947040891—2 pages.
Office Action dated Nov. 4, 2021, in Indonesian patent Application No. P00201908407, dated Nov. 4, 2021—5 pages.
Office Action dated Sep. 2, 2021, in CN patent Application No. 201880024027.0—3 pages.

(Continued)

*Primary Examiner* — John R Hardee
(74) *Attorney, Agent, or Firm* — Oblon, McClelland, Maier & Neustadt, L.L.P.

(57) ABSTRACT

The present invention relates to a refrigerator oil for a mixed refrigerant containing less than 40% by mass of an unsaturated fluorinated hydrocarbon compound (HFO) on a basis of the whole amount of the mixed refrigerant, the refrigerator oil containing a base oil (P) including at least one selected from the group consisting of a polyvinyl ether (PVE), a polyalkylene glycol (PAG), a copolymer (ECP) of a poly(oxy)alkylene glycol or a monoether thereof and a polyvinyl ether, and a polyol ester (POE), with a hydroxy value of the base oil (P) being 15 mgKOH/g or less; and a refrigerator oil composition containing the foregoing refrigerator oil and a specified refrigerant.

2 Claims, No Drawings

(56) References Cited

OTHER PUBLICATIONS

Brazilian Office Action dated May 15, 2022 in Brazilian Patent Application No. 112019021097-0 (with English translation), 5 pages.
Combined Chinese Office Action and Search Report dated Apr. 8, 2022, in corresponding Chinese Patent Application No. 201880024027.0 (with English Translation and English Translation of Category of Cited Documents), 24 pages.

* cited by examiner

REFRIGERATOR OIL AND COMPOSITION FOR REFRIGERATORS

TECHNICAL FIELD

The present invention relates to a refrigerator oil and a refrigerator oil composition containing the refrigerator oil.

BACKGROUND ART

In general, a compression-type refrigerator has such a structure in which not only it is configured of at least a compressor, a condenser, an expansion mechanism (such as an expansion valve), an evaporator, and so on, but also a mixture of a refrigerant and a refrigerator oil (hereinafter also referred to as "refrigerator oil composition") is circulated within a closed system.

As the refrigerant which is used for compression-type refrigerators, fluorinated hydrocarbon compounds with a low environmental load have been being used in place of conventionally frequently used hydrochlorofluorocarbon (HCFC). As the fluorinated hydrocarbon compounds, a saturated fluorinated hydrocarbon compound (Hydro-Fluoro-Carbon; hereinafter also abbreviated as "HFC"), such as 1,1,1,2-tetrafluoroethane (R134a), difluoromethane (R32), and a mixture of difluoromethane and pentafluoroethane (R410A), is frequently used.

In addition, use of an unsaturated fluorinated hydrocarbon compound (Hydro-Fluoro-Olefin; hereinafter also abbreviated as "HFO") having a low global warming potential, such as 1,3,3,3-tetrafluoropropene (R1234ze) and 2,3,3,3-tetrafluoropropene (R1234yf), is also investigated.

Like this, in view of the fact that a refrigerant having a lower global warming potential is demanded, for example, each air conditioner manufacturer adopts an R32 refrigerant (difluoromethane) for room air conditioners or package air conditioners in place of the R410A. In addition, in low temperature apparatuses, a refrigerant is demanded as an alternative for the current R404A.

Then, in particular, in such applications, practical implementation of a refrigerant including the aforementioned HFO has been started to be investigated recently.

For example, PTL 1 discloses a working fluid composition for refrigerators, containing a refrigerant containing a hydrofluoroethane having a specified structure, difluoroethane, and tetrafluoropropene; and a refrigerator oil containing at least one selected from a polyol ester, a polyvinyl ether, and a polyalkylene glycol compound as a base oil, wherein a carbon/oxygen molar ratio of the base oil is 2.5 or more and 5.8 or less.

CITATION LIST

Patent Literature

PTL 1: WO 2013/147048 A

SUMMARY OF INVENTION

Technical Problem

In compression-type refrigerators having the aforementioned structure, depending upon the kind of an apparatus, in general, the temperature becomes high within the compressor, whereas it becomes low within the condenser, and therefore, the refrigerant and the refrigerator oil are required to be circulated within this system without causing phase separation in a wide temperature range of from low temperatures to high temperatures. If phase separation occurs between the refrigerant and the refrigerator oil during operation of the compression-type refrigerator, significant decreases of a life and refrigeration efficiency of the compression-type refrigerator are brought. Consequently, the refrigerator oil is required to have excellent compatibility with the refrigerant to be used.

Here, as mentioned above, practical implementation of a mixed refrigerant containing the HFO is investigated recently, and actually, some mixed refrigerants have been used. However, among such mixed refrigerants, a lot of mixed refrigerants contain the HFO in a low proportion. In the case where the proportion of the HFO occupying in the mixed refrigerant is low, it has been confirmed that compatibility between the mixed refrigerant and the refrigerator oil is inferior (the separation temperature at the high-temperature side decreases, whereas the separation temperature at the low-temperature side increases, so that a temperature region in which the mixed refrigerant and the refrigerator oil are not separated from each other becomes narrow) as compared with, for example, a mixed refrigerant in which the proportion of the HFO in the mixed refrigerant is relatively high as in the refrigerant specifically disclosed in the working examples of PTL 1.

Consequently, as for a refrigerator oil to be used for a mixed refrigerant having a low content proportion of the HFO, it has been noted that development of a refrigerator oil having excellent compatibility with the mixed refrigerant over a wider temperature range of from low temperatures to high temperatures is necessary.

In addition, from the viewpoint of preventing leak current in an apparatus, for the refrigerator oil, electrical properties on the occasion of use as a refrigerator oil composition, specifically a high volume resistivity, are required. However, it has been confirmed that when the proportion of the HFO occupying in the mixed refrigerant is low, the volume resistivity decreases, too.

Consequently, it has also been noted that for a refrigerator oil to be used for a mixed refrigerant having a low content proportion of the HFO, on the occasion of use as a refrigerator oil composition, a higher volume resistivity is required.

In view of the foregoing problems, a problem of the present invention is to provide a refrigerator oil which has excellent compatibility with a mixed refrigerant containing less than 40% by mass of the HFO on a basis of the whole amount of the mixed refrigerant and which a refrigerator oil composition having excellent electrical properties is obtainable from.

Solution to Problem

The present inventor and others made extensive and intensive investigations. As a result, it has been found that a refrigerator oil containing a base oil (P) including a specified compound as a base oil, with a hydroxy value of the base oil (P) being 15 mgKOH/g or less, is able to solve the aforementioned problem. The present invention has been accomplished on the basis of such a finding. Specifically, according to each of embodiments of the present invention, the following [1] to [5] are provided.

[1] A refrigerator oil for a mixed refrigerant containing less than 40% by mass of an unsaturated fluorinated hydrocarbon compound (HFO) on a basis of the whole amount of the mixed refrigerant, the refrigerator oil containing a base oil (P) including at least one selected from the group consisting of a polyvinyl ether (PVE), a polyalkylene glycol (PAG), a copolymer (ECP) of a poly(oxy)alkylene glycol or a monoether thereof and a polyvinyl ether, and a polyol ester (POE), with a hydroxy value of the base oil (P) being 15 mgKOH/g or less.

[2] A refrigerator oil composition containing a mixed refrigerant containing less than 40% by mass of an unsaturated fluorinated hydrocarbon compound (HFO) on a basis of the whole amount of the mixed refrigerant and the refrigerator oil as set forth in the above [1].

[3] A method of producing the refrigerator oil composition as set forth in the above [2], including a step of mixing the refrigerator oil as set forth in the above [1] and a mixed refrigerant containing less than 40% by mass of an unsaturated fluorinated hydrocarbon compound (HFO) on a basis of the whole amount of the mixed refrigerant.

[4] A refrigerator having the refrigerator oil as set forth in the above [1] or the refrigerator oil composition as set forth in the above [2] filled therein.

[5] An air conditioner having the refrigerator oil as set forth in the above [1] or the refrigerator oil composition as set forth in the above [2] filled therein.

Advantageous Effects of Invention

In accordance with the present invention, it is possible to provide a refrigerator oil which has excellent compatibility with a mixed refrigerant containing less than 40% by mass of an HFO on a basis of the whole amount of the mixed refrigerant and which a refrigerator oil composition having excellent electrical properties is obtainable from.

DESCRIPTION OF EMBODIMENTS

[Refrigerator Oil]

The refrigerator oil according to an embodiment of the present invention (hereinafter also referred to simply as "refrigerator oil") is a refrigerator oil for a mixed refrigerant containing less than 40% by mass of an unsaturated fluorinated hydrocarbon compound (HFO) on a basis of the whole amount of the refrigerant (hereinafter also referred to as "low HFO-containing refrigerant"), wherein the refrigerator oil contains a base oil (P) including at least one selected from the group consisting of a polyvinyl ether (hereinafter also referred to as "PVE"), a polyalkylene glycol (hereinafter also referred to as "PAG"), a copolymer of a poly(oxy)alkylene glycol or a monoether thereof and a polyvinyl ether (hereinafter also referred to as "ECP"), and a polyol ester (hereinafter also referred to as "POE"), and a hydroxy value of the base oil (P) is 15 mgKOH/g or less.

In view of the fact that the refrigerator oil contains the base oil (P) having a hydroxy value of 15 mgKOH/g or less, it has excellent compatibility with the aforementioned low HFO-containing refrigerant.

In this specification, a term "hydrocarbon group" means a group constituted of only a carbon atom and a hydrogen atom. In the "hydrocarbon group", there are included an "aliphatic group" constituted of a linear chain or a branched chain, an "alicyclic group" having one or more saturated or unsaturated carbon rings with no aromaticity, and an "aromatic group" having one or more aromatic rings with aromaticity, such as a benzene ring.

In this specification, a term "ring carbon atoms" indicates a number of carbon atoms among atoms constituting a ring itself of a compound having a structure in which the atoms are bonded in a ring form. In the case where the foregoing ring is substituted with a substituent, the carbon(s) contained in the substituent is not included in the ring carbon atoms.

A term "ring atoms" indicates a number of atoms constituting a ring itself of a compound having a structure in which the atoms are bonded in a ring form. An atom not constituting the ring (for example, a hydrogen atom terminating a bond of the atoms constituting the ring), or the atom(s) contained in a substituent in the case where the foregoing ring is substituted with the substituent is not included in the ring atoms.

Examples of the substituent in the description of "substituted or unsubstituted" include an alkyl group having 1 or more and 10 or less (preferably 1 or more and 6 or less, more preferably 1 or more and 4 or less, and still more preferably 1 or more and 3 or less) carbon atoms; a cycloalkyl group having 3 or more and 10 or less (preferably 3 or more and 8 or less, more preferably 4 or more and 6 or less, and still more preferably 5 or 6) ring carbon atoms; an aryl group having 6 or more and 18 or less (preferably 6 or more and 12 or less) ring carbon atoms; a halogen atom (e.g., a fluorine atom, a chlorine atom, a bromine atom, and an iodine atom); a cyano group; a nitro group; a hydroxy group; and an amino group.

These substituents may be further substituted with the aforementioned arbitrary substituent.

A term "unsubstituted" in the description of "substituted or unsubstituted" means that the compound is not substituted with such a substituent, and the hydrogen atom is bonded thereto.

Each of the components which are contained in the refrigerator oil is hereunder described.

<Base Oil (P)>

The base oil (P) which the refrigerator oil contains is a base oil including at least one selected from the group consisting of a polyvinyl ether (PVE), a polyalkylene glycol (PAG), a copolymer (ECP) of a poly(oxy)alkylene glycol or a monoether thereof and a polyvinyl ether, and a polyol ester (POE).

From the viewpoint of compatibility of the refrigerator oil with the low HFO-containing refrigerant as well as the viewpoint of an improvement of volume resistivity of the resulting refrigerator oil composition, the base oil (P) preferably includes at least one selected from the group consisting of PVE, POE, and ECP, more preferably includes at least one selected from the group consisting of PVE and POE, and still more preferably includes PVE.

From the viewpoint of providing a refrigerator oil having excellent compatibility with the low HFO-containing refrigerant, the total content of at least one selected from the group consisting of PVE, POE, ECP, and PAG is preferably 50% by mass or more and 100% by mass or less, more preferably 70% by mass or more and 100% by mass or less, still more preferably 90% by mass or more and 100% by mass or less, yet still more preferably 98% by mass or more and 100% by mass, and even yet still more preferably 100% by mass based on 100% by mass of the whole amount of the base oil (P).

PVE, PAG, ECP, and POE which the base oil (P) contains are hereunder described successively.

(Polyvinyl Ether (PVE))

Examples of the polyvinyl ether (PVE) include polymers having at least one structural unit derived from a vinyl ether. In the case where the PVE is included in the base oil (P), the base oil (P) may contain the PVE alone or may contain a combination of two or more thereof.

Of such PVE's, from the viewpoint of compatibility with the low HFO-containing refrigerant, polymers having at least one structural unit derived from a vinyl ether and having an alkyl group having 1 or more and 4 or less carbon atoms in a side chain thereof are preferred.

Of the PVE's, a polymer (A1) having at least one structural unit represented by the following general formula (A-1) is preferred.

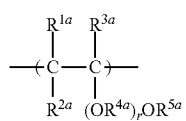

(A-1)

In the general formula (A-1), $R^{1a}$, $R^{2a}$, and $R^{3a}$ each independently represent a hydrogen atom or a hydrocarbon group having 1 or more and 8 or less carbon atoms; $R^{4a}$ represents a divalent hydrocarbon group having 2 or more and 10 or less carbon atoms; and $R^{5a}$ represents a hydrocarbon group having 1 or more and 10 or less carbon atoms.

In the general formula (A-1), r is a mean value of the number of units represented by $OR^{4a}$ and represents a number of 0 or more and 10 or less, and it is preferably a number of 0 or more and 5 or less, more preferably a number of 0 or more and 3 or less, and still more preferably 0.

In the general formula (A-1), in the case where plural $OR^{4a}$'s exist (namely, in the case where r is a number of 2 or more), the plural $OR^{4a}$'s may be the same as or different from each other.

In the case where r is 0, the bond between the carbon atom (C) and $—OR^{5a}$ in the general formula (A-1) is a single bond, and the carbon atom (C) bonds directly to $—OR^{5a}$.

Examples of the hydrocarbon group having 1 or more and 8 or less carbon atoms, which may be selected for $R^{1a}$, $R^{2a}$, and $R^{3a}$, include alkyl groups, such as a methyl group, an ethyl group, various propyl groups, various butyl groups, various pentyl groups, various hexyl groups, various heptyl groups, and various octyl groups; cycloalkyl groups, such as a cyclopentyl group, a cyclohexyl group, various methylcyclohexyl groups, various ethylcyclohexyl groups, and various dimethylcyclohexyl groups; aryl groups, such as a phenyl group, various methylphenyl groups, various ethylphenyl groups, and various dimethylphenyl groups; and arylalkyl groups, such as a benzyl group, various phenylethyl groups, and various methylbenzyl groups.

In this specification, the expression of "various XXX groups" is to include all isomers that are considered as the XXX groups. For example, the term "various alkyl groups" represents "linear, branched, or cyclic hydrocarbon groups". For example, the term "various propyl groups" represents various propyl groups, such as a n-propyl group and an isopropyl group; the term "various butyl groups" represents various butyl groups, such as a n-butyl group, a sec-butyl group, an isobutyl group, a tert-butyl group, and a cyclobutyl group.

The carbon number of the hydrocarbon group which may be selected for $R^{1a}$, $R^{2a}$, and $R^{3a}$ is preferably 1 or more and 6 or less, more preferably 1 or more and 4 or less, and still more preferably 1 or more and 3 or less.

$R^{1a}$, $R^{2a}$, and $R^{3a}$ are each independently preferably a hydrogen atom or an alkyl group having 1 or more and 8 or less carbon atoms, more preferably a hydrogen atom or an alkyl group having 1 or more and 6 or less carbon atoms, still more preferably a hydrogen atom or an alkyl group having 1 or more and 4 or less carbon atoms, and yet still more preferably a hydrogen atom or an alkyl group having 1 or more and 3 or less carbon atoms.

$R^{1a}$, $R^{2a}$, and $R^{3a}$ each may be the same as or different from each other.

Examples of the divalent hydrocarbon group having 2 or more and 10 or less carbon atoms, which may be selected for $R^{4a}$, include divalent aliphatic groups, such as an ethylene group, a 1,2-propylene group, a 1,3-propylene group, various butylene groups, various pentylene groups, various hexylene groups, various heptylene groups, various octylene groups, various nonylene groups, and various decylene groups; alicyclic groups that are a divalent residue of an alicyclic compound, such as cyclohexane, methylcyclohexane, ethylcyclohexane, dimethylcyclohexane, and propylcyclohexane; divalent aromatic groups, such as various phenylene groups, various methylphenylene groups, various ethylphenylene groups, various dimethylphenylene groups, and various naphthylene groups; divalent alkyl-aromatic groups having a monovalent bonding site in each of the alkyl group moiety and the aromatic moiety of an alkyl-aromatic hydrocarbon, such as toluene, xylene, and ethylbenzene; and divalent alkyl-aromatic groups having a bonding site in the alkyl group moiety of a polyalkyl-aromatic hydrocarbon, such as xylene and diethylbenzene.

The carbon number of the hydrocarbon group which may be selected for $R^{4a}$ is preferably 2 or more and 8 or less, more preferably 2 or more and 6 or less, and still more preferably 2 or more and 4 or less.

$R^{4a}$ is preferably a divalent aliphatic group having 2 or more and 10 or less carbon atoms, preferably a divalent aliphatic group having 2 or more and 6 or less carbon atoms, and still more preferably a divalent aliphatic group having 2 or more and 4 or less carbon atoms.

Examples of the hydrocarbon group having 1 or more and 10 or less carbon atoms, which may be selected for $R^{5a}$, include alkyl groups, such as a methyl group, an ethyl group, various propyl groups, various butyl groups, various pentyl groups, various hexyl groups, various heptyl groups, various octyl groups, various nonyl groups, and various decyl groups; cycloalkyl groups, such as a cyclopentyl group, a cyclohexyl group, various methylcyclohexyl groups, various ethylcyclohexyl groups, various propylcyclohexyl groups, and various dimethylcyclohexyl groups; aryl groups, such as a phenyl group, various methylphenyl groups, various ethylphenyl groups, various dimethylphenyl groups, various propylphenyl groups, various trimethylphenyl groups, various butylphenyl groups, and various naphthyl groups; and arylalkyl groups, such as a benzyl group, various phenylethyl groups, various methylbenzyl groups, various phenylpropyl groups, and various phenylbutyl groups.

The carbon number of the hydrocarbon group which may be selected for $R^{5a}$ is preferably 1 or more and 8 or less, and more preferably 1 or more and 6 or less.

From the viewpoint of more improving the compatibility with the low HFO-containing refrigerant, $R^{5a}$ is preferably an alkyl group having 1 or more and 6 or less carbon atoms, more preferably an alkyl group having 1 or more and 4 carbon atoms, and still more preferably a methyl group or an ethyl group.

In an embodiment of the present invention, preferably, the polymer (A1) has a structural unit ($\alpha$1) wherein $R^{5a}$ is an ethyl group.

The content of the structural unit ($\alpha$1) is preferably 30% by mass or more and 100% by mass or less, more preferably 40% by mass or more and 100% by mass or less, and still more preferably 50% by mass or more and 100% by mass or less on a basis of the whole amount (100% by mass) of the structural units which the polymer (A1) has.

In an embodiment of the present invention, the copolymer (A1) may be a copolymer having a structural unit (α1) wherein $R^{5a}$ is an ethyl group and a structural unit (α2) wherein $R^{5a}$ is a methyl group.

In the foregoing copolymer, a mass ratio of the structural unit (α1) to the structural unit (α2) [α1/α2] is preferably 30/70 or more and 99/1 or less, more preferably 40/60 or more and 95/5 or less, and still more preferably 50/50 or more and 90/10 or less.

The total content of the structural units (α1) and (α2) in the polymer (A1) is preferably 70% by mass or more and 100% by mass or less, more preferably 80% by mass or more and 100% by mass or less, still more preferably 90% by mass or more and 100% by mass or less, and yet still more preferably 95% by mass or more and 100% by mass or less on a basis of the whole amount (100% by mass) of the structural units which the polymer (A1) has.

In the polymer (A1), the number of units of the structural unit (polymerization degree) represented by the general formula (A-1) may be suitably set such that a hydroxy value of the base oil (P) falls within a range of 15 mgKOH/g or less.

The polymer (A1) may be a homopolymer having only one kind of the structural unit represented by the general formula (A-1), or may be a copolymer having two or more kinds of the structural units.

The copolymerization morphology of the copolymer is not particularly limited and may be a block copolymer, may be a random copolymer, or may be a graft copolymer.

Into the terminal part of the polymer (A1), a monovalent group derived from saturated hydrocarbons, ethers, alcohols, ketones, amides, nitriles, and the like may be introduced.

In an embodiment of the present invention, one terminal of the polymer (A1) is preferably a group represented by the following general formula (A-1-i):

(A-1-i)

In the general formula (A-1-i), * indicates the bonding position to the carbon atom in the structural unit represented by the general formula (A-1).

In the general formula (A-1-i), $R^{6a}$, $R^{7a}$, and $R^{8a}$ each independently represent a hydrogen atom or a hydrocarbon group having 1 or more and 8 or less carbon atoms, preferably a hydrogen atom or a hydrocarbon group having 1 or more and 6 or less carbon atoms, more preferably a hydrogen atom or an alkyl group having 1 or more and 6 or less carbon atoms, and still more preferably a hydrogen atom or an alkyl group having 1 or more and 3 or less carbon atoms.

$R^{6a}$, $R^{7a}$, and $R^{8a}$ each may be the same as or different from each other.

As the hydrocarbon group having 1 or more and 8 or less carbon atoms, which may be selected for $R^{6a}$, $R^{7a}$, and $R^{8a}$, there are exemplified the same ones as those enumerated as the hydrocarbon group having 1 or more and 8 or less carbon atoms, which may be selected for $R^{1a}$, $R^{2a}$, and $R^{3a}$ in the general formula (A-1).

In the general formula (A-1-i), $R^{9a}$ represents a divalent hydrocarbon group having 2 or more and 10 or less carbon atoms, and it is preferably a divalent hydrocarbon group having 2 or more and 8 or less carbon atoms, more preferably a divalent hydrocarbon group having 2 or more and 6 or less carbon atoms, and still more preferably a divalent aliphatic group having 2 or more and 4 or less carbon atoms.

In the general formula (A-1-i), r1 is a mean value of the number of units represented by $OR^{9a}$ and represents a number of 0 or more and 10 or less, and it is preferably a number of 0 or more and 5 or less, more preferably a number of 0 or more and 3 or less, and still more preferably 0.

In the general formula (A-1-i), in the case where plural $OR^{9a}$'s exist (namely, in the case where r1 is a number of 2 or more), the plural $OR^{9a}$'s may be the same as or different from each other.

In the case where r1 is 0, the bond between the carbon atom (C) and $—OR^{10a}$ in the general formula (A-1-i) is a single bond, and the carbon atom (C) bonds directly to $—OR^{10a}$.

As the divalent hydrocarbon group having 2 or more and 10 or less carbon atoms, which may be selected for $R^{9a}$, there are exemplified the same ones as those enumerated as the divalent hydrocarbon group having 2 or more and 10 or less carbon atoms, which may be selected for $R^{4a}$ in the general formula (A-1).

In the general formula (A-1-i), $R^{10a}$ represents a hydrocarbon group having 1 or more and 10 or less carbon atoms, and it is preferably a hydrocarbon group having 1 or more and 8 or less carbon atoms, and more preferably an alkyl group having 1 or more and 8 or less carbon atoms.

In the case where r1 in the general formula (A-1-i) is 0, $R^{10a}$ is more preferably an alkyl group having 1 or more and 6 or less carbon atoms, and in the case where r1 is 1 or more, $R^{10a}$ is more preferably an alkyl group having 1 or more and 4 or less carbon atoms.

As the hydrocarbon group having 1 or more and 10 or less carbon atoms, which may be selected for $R^{10a}$, there are exemplified the same ones as those enumerated as the hydrocarbon group having 1 or more and 10 or less carbon atoms, which may be selected for $R^{5a}$ in the general formula (A-1).

Preferably, in the polymer (A1), one terminal is the group represented by the general formula (A-1-i), and the other terminal is one selected from the group consisting of the group represented by the general formula (A-1-i), a group represented by the following general formula (A-1-ii), a group represented by the following general formula (A-1-iii), and a group having an olefinic unsaturated bond.

(A-1-ii)

(A-1-iii)

In the general formulae (A-1-ii) and (A-1-iii), $R^{11a}$, $R^{12a}$, $R^{13a}$, $R^{18a}$, $R^{19a}$, and $R^{20a}$ each independently represent a hydrogen atom or a hydrocarbon group having 1 or more and 8 or less carbon atoms, preferably a hydrogen atom or a hydrocarbon group having 1 or more and 6 or less carbon atoms, more preferably a hydrogen atom or an alkyl group having 1 or more and 6 or less carbon atoms, and still more preferably a hydrogen atom or an alkyl group having 1 or more and 3 or less carbon atoms. $R^{11a}$, $R^{12a}$, $R^{13a}$, $R^{18a}$, and $R^{20a}$ each may be the same as or different from each other.

As the hydrocarbon group which may be selected for $R^{11a}$, $R^{12a}$, $R^{13a}$, $R^{18a}$, $R^{19a}$, and $R^{20a}$, there are exemplified the same ones as those enumerated as the hydrocarbon group having 1 or more and 8 or less carbon atoms, which may be selected for $R^{1a}$, $R^{2a}$, and $R^{3a}$ in the general formula (A-1).

In the general formula (A-1-ii), $R^{14a}$ and $R^{16a}$ each independently represent a divalent hydrocarbon group having 2 or more and 10 or less carbon atoms, preferably a divalent hydrocarbon group having 2 or more and 6 or less carbon atoms, and more preferably a divalent aliphatic group having 2 or more and 4 or less carbon atoms. As the divalent hydrocarbon group which may be selected for $R^{14a}$ and $R^{16a}$, there are exemplified the same ones as those enumerated as the divalent hydrocarbon group, which may be selected for $R^{4a}$ in the general formula (A-1).

In the general formula (A-1-ii), r2 and r3 are each a mean value of the number of units represented by $OR^{14a}$ and $OR^{16a}$ and each independently represent a number of 0 or more and 10 or less, and they are each preferably a number of 0 or more and 5 or less, more preferably a number of 0 or more and 3 or less, and still more preferably 0.

In the general formula (A-1-ii), in the case where plural $OR^{14a}$'s and $OR^{16a}$'s exist, the plural $OR^{14a}$'s and the plural $OR^{16}$'s each may be the same as or different from each other.

In the case where r2 is 0, the bond between the carbon atom (C) and —$OR^{15a}$ in the general formula (A-1-ii) is a single bond, and the carbon atom (C) bonds directly to —$OR^{15a}$. Similarly, in the case where r3 is 0, the bond between the carbon atom (C) and —$OR^{17a}$ in the general formula (A-1-ii) is a single bond, and the carbon atom (C) bonds directly to —$OR^{17a}$.

In the general formula (A-1-ii), $R^{15a}$ and $R^{17a}$ each independently represent a hydrocarbon group having 1 or more and 10 or less carbon atoms, preferably a hydrocarbon group having 1 or more and 8 or less carbon atoms, and more preferably an alkyl group having 1 or more and 8 or less carbon atoms.

In the case where r2 is 0, $R^{15a}$ is still more preferably an alkyl group having 1 or more and 6 or less carbon atoms, and in the case where r2 is 1 or more, $R^{15a}$ is still more preferably an alkyl group having 1 or more and 4 or less carbon atoms. Similarly, in the case where r3 is 0, $R^{17a}$ is still more preferably an alkyl group having 1 or more and 6 or less carbon atoms, and in the case where r3 is 1 or more, $R^{17a}$ is still more preferably an alkyl group having 1 or more and 4 or less carbon atoms.

(Polyoxyalkylene Glycol (PAG))

The polyoxyalkylene glycol (PAG) is preferably a compound (B1) represented by the following general formula (B-1). In the case where the PAG is included in the base oil (P), the PAG may be contained alone or may be contained in combination of two or more thereof.

$$R^{1b}—[(OR^{2b})_m—OR^{3b}]_n \quad (B-1)$$

In the general formula (B-1), $R^{1b}$ represents a hydrogen atom, a monovalent hydrocarbon group having 1 or more and 10 or less carbon atoms, an acyl group having 2 or more and 10 or less carbon atoms, a hydrocarbon group having a valence of 2 or more and 6 or less and having 1 or more and 10 or less carbon atoms, or a substituted or unsubstituted heterocyclic group having 3 or more and 10 or less ring atoms.

$R^{2b}$ represents an alkylene group having 2 or more and 4 or less carbon atoms.

$R^{3b}$ represents a hydrogen atom, a monovalent hydrocarbon group having 1 or more and 10 or less carbon atoms, an acyl group having 2 or more and 10 or less carbon atoms, or a substituted or unsubstituted heterocyclic group having 3 or more and 10 or less ring atoms.

In the general formula (B-1), n represents an integer of 1 or more and 6 or less, preferably an integer of 1 or more and 4 or less, more preferably an integer of 1 or more and 3 less, and still more preferably 1.

n is defined in accordance with the number of bonding sites of $R^{1b}$ in the general formula (B-1). For example, in the case where $R^{1b}$ is an alkyl group or an acyl group, n is 1, and in the case where Rb is a hydrocarbon group or a heterocyclic group, and the valence of the foregoing group is 2, 3, 4, 5, or 6, n is 2, 3, 4, 5, or 6, respectively.

In the general formula (B-1), m is a mean value of the number of units represented by $OR^{2b}$ and represents a number of 1 or more, and it is preferably a number to make the mean value of (m×n) fall within a range of 6 or more and 80 or less. The value of m is a value which is suitably set such that the hydroxy value of the base oil (P) falls within a range of 15 mgKOH/g or less, and it is not particularly limited so long as it is adjusted such that the foregoing hydroxy value falls within the predetermined range.

In the case where plural $OR^{2b}$'s exist, the plural $OR^{2b}$'s may be the same as or different from each other. In addition, in the case where n is 2 or more, plural $R^{3b}$'s in one molecule may be the same as or different from each other.

Examples of the monovalent hydrocarbon group which may be selected for $R^{1b}$ and $R^{3b}$ include alkyl groups, such as a methyl group, an ethyl group, various propyl groups, various butyl groups, various pentyl groups, various hexyl groups, various heptyl groups, various octyl groups, various nonyl groups, and various decyl groups; cycloalkyl groups, such as a cyclopentyl group, a cyclohexyl group, various methylcyclohexyl groups, various ethylcyclohexyl groups, various propylcyclohexyl groups, and various dimethylcyclohexyl groups; aryl groups, such as a phenyl group, various methylphenyl groups, various ethylphenyl groups, various dimethylphenyl groups, various propylphenyl groups, various trimethylphenyl groups, various butylphenyl groups, and various naphthyl groups; and arylalkyl groups, such as a benzyl group, various phenylethyl groups, various methylbenzyl groups, various phenylpropyl groups, and various phenylbutyl groups.

From the viewpoint of compatibility with the low HFO-containing refrigerant, the carbon number of the monovalent hydrocarbon group is preferably 1 or more and 10 or less, more preferably 1 or more and 6 or less, and still more preferably 1 or more and 3 or less.

The hydrocarbon group moiety which the acyl group having 2 or more and 10 or less carbon atoms has and capable of being selected for $R^{1b}$ and $R^{3b}$ may be any of a linear, branched, or cyclic one. Examples of the alkyl group moiety includes those having 1 or more and 9 or less carbon atoms of the hydrocarbon group which may be selected for $R^{1b}$ and $R^{3b}$.

From the viewpoint of compatibility with the low HFO-containing refrigerant, the carbon number of the acyl group is preferably 2 or more and 10 or less, more preferably 2 or more and 8 or less, and still more preferably 2 or more and 6 or less.

Examples of the hydrocarbon group having a valence of 2 or more and 6 or less, which may be selected for $R^{1b}$, include residues obtained by further removing 1 or more and 5 or less hydrogen atoms from the monovalent hydrocarbon group which may be selected for $R^{1b}$; and residues obtained by removing a hydroxy group from a polyhydric alcohol, such as trimethylolpropane, glycerin, pentaerythritol, sorbitol, 1,2,3-trihydroxycyclohexane, and 1,3,5-trihydroxycyclohexane.

From the viewpoint of compatibility with the low HFO-containing refrigerant, the carbon number of the hydrocarbon group having a valence of 2 or more and 6 or less is preferably 2 or more and 10 or less, more preferably 2 or more and 8 or less, and still more preferably 2 or more and 6 or less.

The heterocyclic group which may be selected for $R^{1b}$ and $R^{3b}$ is preferably an oxygen atom-containing heterocyclic group or a sulfur atom-containing heterocyclic group. The heterocyclic group may be a saturated ring or may be an unsaturated ring.

Examples of the oxygen atom-containing heterocyclic group include residues obtained by removing 1 or more and 6 or less hydrogen atoms from an oxygen atom-containing saturated heterocyclic ring, such as ethylene oxide, 1,3-propylene oxide, tetrahydrofuran, tetrahydropyran, and hexamethylene oxide, or from an oxygen-containing unsaturated heterocyclic ring, such as acetylene oxide, furan, pyran, oxycycloheptatriene, isobenzofuran, and isochromene.

Examples of the sulfur atom-containing heterocyclic group include residues obtained by removing 1 or more and 6 or less hydrogen atoms from a sulfur atom-containing saturated heterocyclic ring, such as ethylene sulfide, trimethylene sulfide, tetrahydrothiophene, tetrahydrothiopyran, and hexamethylene sulfide, or from a sulfur-containing unsaturated heterocyclic ring, such as acetylene sulfide, thiophene, thiapyran, and thioterpyridine.

The heterocyclic group which may be selected for $R^{1b}$ and $R^{3b}$ may have a substituent, and the substituent may bond to the oxygen atom in the general formula (B-1). The substituent is as mentioned above, and is preferably an alkyl group having 1 or more and 6 or less carbon atoms, more preferably an alkyl group having 1 or more and 4 or less carbon atoms, and still more preferably 1 or more and 3 or less carbon atoms.

From the viewpoint of compatibility with the low HFO-containing refrigerant, the ring atoms of the heterocyclic group is preferably 3 or more and 10 or less, more preferably 3 or more and 8 or less, and still more preferably 3 or more and 6 or less.

Examples of the alkylene group which may be selected for $R^{2b}$ include an alkylene group having 2 carbon atoms, such as a dimethylene group (—$CH_2CH_2$—) and an ethylene group (—$CH(CH_3)$—); an alkylene group having 3 carbon atoms, such as a trimethylene group (—$CH_2CH_2CH_2$—), a propylene group (—$CH(CH_3)CH_2$—), a propylidene group (—$CHCH_2CH_3$—), and an isopropylidene group (—$C(CH_3)_2$—); and an alkylene group having 4 carbon atoms, such as a tetramethylene group (—$CH_2CH_2CH_2CH_2$—), a 1-methyltrimethylene group (—$CH(CH_3)CH_2CH_2$—), a 2-methyltrimethylene group (—$CH_2CH(CH_3)CH_2$—), and a butylene group (—$C(CH_3)_2CH_2$—).

In the case where plural $R^{2b}$'s exist, the plural $R^{2b}$'s may be the same as or different from each other and may be a combination of two or more alkylene groups.

Of these alkylene groups, $R^{2b}$ is preferably a propylene group (—$CH(CH_3)CH_2$—).

In the compound (B1) represented by the general formula (B-1), the content of the oxypropylene unit (—$OCH(CH_3)CH_2$—) is preferably 50 mol % or more and 100 mol % or less, more preferably 65 mol % or more and 100 mol % or less, and still more preferably 80 mol % or more and 100 mol % or less on a basis of the whole amount (100 mol %) of the oxyalkylene unit ($OR^{2b}$) in the compound (B1).

The compound (B1) is preferably at least one selected from the group consisting of polyoxypropylene glycol dimethyl ether represented by the following general formula (B-1-i), polyoxyethylene polyoxypropylene glycol dimethyl ether represented by the following general formula (B-1-ii), polyoxypropylene glycol monobutyl ether represented by the following general formula (B-1-iii), and polyoxypropylene glycol diacetate.

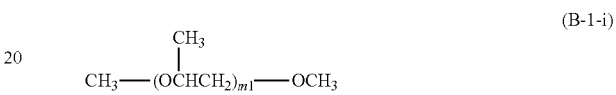
(B-1-i)

In the formula (B-1-i), m1 is a mean value of the number of oxypropylene units and represents a number of 1 or more, and it is preferably a number of 6 or more and 80 or less.

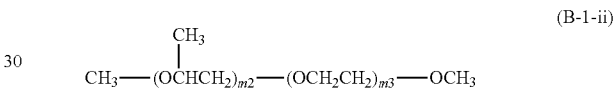
(B-1-ii)

In the formula (B-1-ii), m2 and m3 are each a mean value of the number of oxypropylene units and that of oxyethylene units, respectively and each independently represent a number of 1 or more, and they are each preferably a number to make the value of (m2+m3) fall within a range of 6 or more and 80 or less.

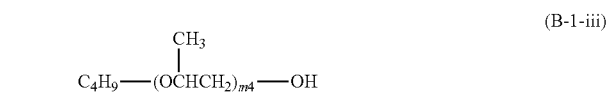
(B-1-iii)

In the formula (B-1-iii), m4 is a mean value of the number of oxypropylene units and represents a number of 1 or more, and it is preferably a number of 6 or more and 80 or less.

m1 in the general formula (B-1-i), m2 and m3 in the general formula (B-1-ii), and m4 in the general formula (B-1-iii) are each a value suitably set such that the hydroxy value of the base oil (P) falls within a range of 15 mgKOH/g or less, and these are not particularly limited so long as they are adjusted such that the foregoing hydroxy value falls within the predetermined range.

(Copolymer (ECP) of Poly(oxy)alkylene Glycol or Monoether Thereof and Polyvinyl Ether)

The copolymer (ECP) of a poly(oxy)alkylene glycol or a monoether thereof and a polyvinyl ether may be a copolymer having a structural unit derived from a poly(oxy)alkylene glycol or a monoether thereof and a structural unit derived from a polyvinyl ether.

The term "poly(oxy)alkylene glycol" indicates both a polyalkylene glycol and a polyoxyalkylene glycol.

In the case where the ECP is included in the base oil (P), the base oil (P) may contain the ECP alone or may contain a combination of two or more thereof.

The ECP is preferably a copolymer (C1) represented by the following general formula (C-1) or a copolymer (C2) represented by the following general formula (C-2).

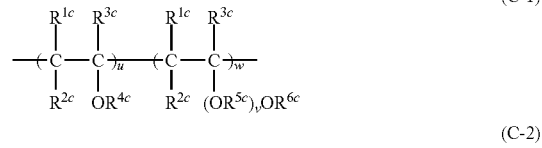
(C-1)

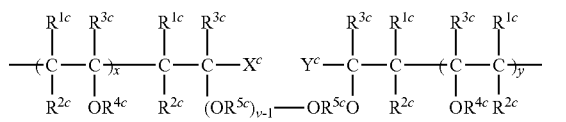
(C-2)

In the general formulae (C-1) and (C-2), $R^{1c}$, $R^{2c}$, and $R^{3c}$ each independently represent a hydrogen atom or a hydrocarbon group having 1 or more and 8 or less carbon atoms.

$R^{4c}$'s each independently represent a hydrocarbon group having 1 or more and 10 or less carbon atoms.

$R^{4c}$'s each independently represent an alkylene group having 2 or more and 4 or less carbon atoms.

$R^{6c}$'s each independently represent a hydrogen atom, an alkyl group having 1 or more and 20 or less carbon atoms, a substituted or unsubstituted alicyclic group having 3 or more and 20 or less ring carbon atoms, a substituted or unsubstituted aromatic group having 6 or more and 24 or less ring carbon atoms, an acyl group having 2 or more and 20 or less carbon atoms, or an oxygen-containing hydrocarbon group having 2 or more and 50 or less carbon atoms.

In the case where plural $R^{1c}$'s, $R^{2c}$'s, $R^{3c}$'s, $R^{4c}$'s, $R^{5c}$'s, and $R^{5c}$'s exist, respectively, these may be the same as or different from each other in every structural unit.

$X^C$ and $Y^C$ each independently represent a hydrogen atom, a hydroxy group, or a hydrocarbon group having 1 or more and 20 or less carbon atoms.

v in the general formulae (C-1) and (C-2) is a mean value of the number of units represented by $OR^5c$ and represents a number of 1 or more, and it is preferably a number of 1 or more and 50 or less. In the case where plural $OR^{5c}$'s exist, the plural $OR^{5c}$'s may be the same as or different from each other. "$OR^{5c}$" indicates a structural unit derived from a poly(oxy)alkylene glycol or a monoether thereof.

u in the general formula (C-1) represents a number of 0 or more, and it is preferably a number of 0 or more and 50 or less; and w represents a number of 1 or more, and it is preferably a number of 1 or more and 50 or less.

x and y in the general formula (C-2) each independently represent a number of 1 or more, and they are each preferably a number of 1 or more and 50 or less.

The values of v, u, w, x, and y are each a value set such that the hydroxy value of the base oil falls within a range of 15 mgKOH/g or less, and they are not particularly limited so long as they are adjusted such that the foregoing hydroxy value falls within the predetermined range.

The copolymerization morphology of each of the copolymer (C1) and the copolymer (C2) is not particularly limited and may be a block copolymer, may be a random copolymer, or may be a graft copolymer.

As the hydrocarbon group having 1 or more and 8 or less carbon atoms, which may be selected for $R^{1c}$, $R^{2c}$, and $R^{3c}$, there are exemplified the same ones as those enumerated for the monovalent hydrocarbon group having 1 or more and 8 or less carbon atoms, which may be selected for $R^{1a}$, $R^{2a}$, and $R^{3a}$ in the general formula (A-1).

The carbon number of the hydrocarbon group which may be selected for $R^{1c}$, $R^{2c}$, and $R^{3c}$ is preferably 1 or more and 8 or less, more preferably 1 or more and 6 or less, and still more preferably 1 or more and 3 or less.

Preferably, $R^{1c}$, $R^{2c}$, and $R^{3c}$ are each independently a hydrogen atom or an alkyl group having 1 or more and 8 or less carbon atoms, more preferably a hydrogen atom or an alkyl group having 1 or more and 6 or less carbon atoms, and still more preferably a hydrogen atom or an alkyl group having 1 or more and 3 or less carbon atoms.

Also preferably, at least one of $R^{1c}$, $R^{2c}$, and $R^{3c}$ is a hydrogen atom, and more preferably, all of $R^{1c}$, $R^{2c}$, and $R^{3c}$ are a hydrogen atom.

As the hydrocarbon group having 1 or more and 10 or less carbon atoms, which may be selected for $R^{4c}$, there are exemplified the same ones as those enumerated for the hydrocarbon group having 1 or more and 10 or less carbon atoms, which may be selected for $R^{5a}$ in the general formula (A-1).

The carbon number of the hydrocarbon group which may be selected for $R^{4c}$ is preferably 1 or more and 8 or less, more preferably 1 or more and 6 or less, and still more preferably 1 or more and 4 or less.

As the alkylene group which may be selected for $R^{5c}$, there are exemplified the same ones as those enumerated for the alkylene group having 2 or more and 4 or less carbon atoms, which may be selected for $R^{2b}$ in the general formula (B-1), and the alkylene group is preferably a propylene group ($-CH(CH_3)CH_2-$).

In the copolymer (C1) or the copolymer (C2), the content of the oxypropylene unit ($-OCH(CH_3)CH_2-$) is preferably 50 mol % or more and 100 mol % or less, more preferably 65 mol % or more and 100 mol % or less, and still more preferably 80 mol % or more and 100 mol % or less on a basis of the whole amount (100 mol %) of the oxyalkylene ($OR^{5c}$) that is a structural unit derived from the poly(oxy)alkylene glycol or its monoether in the copolymer (C1) or the copolymer (C2).

Examples of the alkyl group having 1 or more and 20 or less carbon atoms, which may be selected for $R^{6c}$, include a methyl group, an ethyl group, various propyl groups, various butyl groups, various pentyl groups, various hexyl groups, various heptyl groups, various octyl groups, various nonyl groups, and various decyl groups.

The carbon number of the alkyl group is preferably 1 or more and 10 or less, more preferably 1 or more and 6 or less, and still more preferably 1 or more and 3 or less.

Examples of the alicyclic group having 3 or more and 20 or less ring carbon atoms, which may be selected for Re, include a cyclopropyl group, a cyclobutyl group, a cyclopentyl group, a cyclohexyl group, a cycloheptyl group, a cyclooctylgroup, a cyclononyl group, and a cyclodecyl group.

The number of ring carbon atoms of the alicyclic group is preferably 3 or more and 10 or less, more preferably 3 or more and 8 or less, and still more preferably 3 or more and 6 or less.

The alicyclic group may have any substituent mentioned above, and as the substituent, an alkyl group is preferred.

Examples of the aromatic group having 6 or more and 24 or less ring carbon atoms, which may be selected for Re, include a phenyl group, a naphthylgroup, an anthracenylgroup, and a phenanthrylgroup.

The number of ring carbon atoms of the aromatic group is preferably 6 or more and 18 or less, and more preferably 6 or more and 12 or less.

The aromatic group may have any substituent mentioned above, and as the substituent, an alkyl group is preferred.

Examples of the acyl group having 2 or more and 20 or less ring carbon atoms, which may be selected for Re, include an acetyl group, a propionyl group, a butyryl group, an isobutyryl group, a valeryl group, an isovaleryl group, a pivaloyl group, a benzoyl group, and a toluoyl group.

The carbon number of the acyl group is preferably 2 or more and 10 or less, more preferably 2 or more and 8 or less, and still more preferably 2 or more and 6 or less.

Examples of the oxygen-containing hydrocarbon group having 2 or more and 50 or less carbon atoms, which may be selected for Rce, include a methoxymethyl group, a methoxyethyl group, a methoxypropyl group, a 1,1-bismethoxypropyl group, a 1,2-bismethoxypropyl group, an ethoxypropyl group, a (2-methoxyethoxy)propyl group, and a (1-methyl-2-methoxy)propyl group.

The carbon number of the oxygen-containing hydrocarbon group is preferably 2 or more and 20 or less, more preferably 2 or more and 10 or less, and still more preferably 2 or more and 6 or less.

The hydrocarbon group having 1 or more and 20 or less carbon atoms, which may be selected for $X^C$ and $Y^C$, includes an alkyl group having 1 or more and 20 or less (preferably 1 or more and 10 or less, more preferably 1 or more and 6 or less, and still more preferably 1 or more and 3 or less) carbon atoms, a substituted or unsubstituted cycloalkyl group having 3 or more and 20 or less (preferably 3 or more and 10 or less, more preferably 3 or more and 8 or less, and still more preferably 3 or more and 6 or less) ring carbon atoms, a substituted or unsubstituted phenyl group, a substituted or unsubstituted naphthyl group, and an arylalkyl group having 7 or more and 20 or less (preferably 7 or more and 13 or less) carbon atoms.

(Polyol Ester (POE))

Examples of the polyol ester (POE) include esters of a diol or a polyol and a fatty acid. In the case where the POE is included in the base oil (P), the base oil (P) may contain the POE alone or may contain a combination of two or more thereof.

Of such POE's, an ester of a diol or a polyol having 3 or more and 20 or less hydroxy groups and a fatty acid having 3 or more and 20 or less carbon atoms is preferred.

Examples of the diol include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, and 1,12-dodecanediol.

Examples of the polyol include polyhydric alcohols, such as trimethylolethane, trimethylolpropane, trimethylolbutane, di-(trimethylolpropane), tri-(trimethylolpropane), pentaerythritol, di-(pentaerythritol), tri-(pentaerythritol), glycerin, a polyglycerin (e.g., dimer to icosamer of glycerin), 1,3,5-pentanetriol, sorbitol, sorbitan, a sorbitol-glycerin condensate, adonitol, arabitol, xylitol, and mannitol; saccharides, such as xylose, arabinose, ribose, rhamnose, glucose, fructose, galactose, mannose, sorbose, cellobiose, maltose, isomaltose, trehalose, sucrose, raffinose, gentianose, and melenzitose; as well as partially esterified derivatives and methyl glucosides (glycosides) thereof.

Of these polyols, hindered alcohols, such as neopentyl glycol, trimethylolethane, trimethylolpropane, trimethylolbutane, di-(trimethylolpropane), tri-(trimethylolpropane), pentaerythritol, di-(pentaerythritol), and tri-(pentaerythritol), are preferred.

The carbon number of the fatty acid is preferably 3 or more, and more preferably 4 or more from the viewpoint of lubrication performance; and it is preferably 20 or less, more preferably 16 or less, and still more preferably 9 or less from the viewpoint of compatibility with the low HFO-containing refrigerant.

The carbon number of the fatty acid also includes the carbon atom of the carboxy group (—COOH) which the fatty acid has.

Although the fatty acid may be a linear fatty acid or may be a branched fatty acid, a linear fatty acid is preferred from the viewpoint of lubrication performance, whereas a branched fatty acid is preferred from the viewpoint of hydrolysis stability. Furthermore, the fatty acid may be a saturated fatty acid or may be an unsaturated fatty acid.

Examples of the fatty acid include linear fatty acids or branched fatty acids, such as isobutyric acid, propionic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, and oleic acid, as well as so-called neo acids in which the α-carbon atom is quaternized.

The fatty acid is preferably at least one selected from the group consisting of isobutyric acid, valeric acid (n-pentanoic acid), caproic acid (n-hexanoic acid), enanthic acid (n-heptanoic acid), caprylic acid (n-octanoic acid), pelargonic acid (n-nonanoic acid), capric acid (n-decanoic acid), oleic acid (cis-9-octadenoic acid), isopentanoic acid (3-methylbutanoic acid), 2-methylhexanoic acid, 2-ethylpentanoic acid, 2-ethylhexanoic acid, and 3,5,5-trimethylhexanoic acid.

The POE may be a partial ester in which all hydroxy groups of a polyol are not esterified but remain as such, or a complete ester in which all hydroxy groups are esterified; or may also be a mixture of the foregoing partial ester and the foregoing complete ester. The POE is preferably a complete ester.

Of the POE's, from the viewpoint of more excellent hydrolysis stability, an ester of a hindered alcohol, such as neopentyl glycol, trimethylolethane, trimethylolpropane, trimethylolbutane, di-(trimethylolpropane), tri-(trimethylolpropane), pentaerythritol, di-(pentaerythritol), and tri-(pentaerythritol), is preferred; and an ester of neopentyl glycol, trimethylolethane, trimethylolpropane, trimethylolbutane, pentaerythritol, or di-(pentaerythritol), is more preferred; and from the viewpoint of still more excellent compatibility with the low HFO-containing refrigerant and hydrolysis stability, an ester of pentaerythritol and an ester of di-(pentaerythritol) are still more preferred.

As a suitable embodiment of the POE, examples thereof include a diester of neopentyl glycol with at least one fatty acid selected from the group consisting of isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolethane with at least one fatty acid selected from the group consisting of isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolpropane with at least one fatty acid selected from the group consisting of isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolbutane with at least one fatty acid selected from the group consisting of isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; and a tetraester of pentaerythritol with at least one fatty acid selected from the group consisting of isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid.

Of the POE's, from the viewpoint of compatibility with the low HFO-containing refrigerant, an ester of a polyol with a mixture of two or more fatty acids is preferred, and an ester of a polyol having 2 or more and 20 or less hydroxy groups with a mixture of two or more fatty acids each having 3 or more and 20 or less carbon atoms.

As examples of the mixture of two or more fatty acids, a mixed fatty acid of a combination of two or more fatty acids selected from the group consisting of fatty acids having 4 or more and 9 or less carbon atoms is preferred; at least one mixed fatty acid selected from the group consisting of a mixed fatty acids of a combination of fatty acids having 8 and 9 carbon atoms, respectively, a mixed fatty acid of a combination of fatty acids having 5 and 9 carbon atoms, respectively, and a mixed fatty acid of a combination of fatty acids having 4, 5, and 9 carbon atoms, respectively is more preferred; and a mixed fatty acid of a combination of fatty acids having 8 and 9 carbon atoms, respectively is still more preferred.

In the case of an ester with two or more fatty acids, the ester may be a mixture of two or more esters of one fatty acid and a polyol.

Preferably, number average molecular weights (Mn) of PVE, PAG, ECP, and POE are each independently 300 or more and 3,000 or less.

When the number average molecular weight (Mn) is 300 or more, the lubricity and the sealing performance become favorable. On the other hand, when the number average molecular weight (Mn) is 3,000 or less, the compatibility with the low HFO-containing refrigerant becomes favorable.

From the foregoing viewpoint, the number average molecular weights (Mn) of PVE, PAG, ECP, and POE are each independently more preferably 350 or more, and still more preferably 400 or more, and more preferably 1,500 or less, and still more preferably 1,200 or less.

The number average molecular weight (Mn) is a value measured by the method described in the section of Examples as mentioned later.

(Other Base Oil)

The base oil (P) may further contain other base oil in addition to at least one base oil selected from the group consisting of PVE, PAG, ECP, and POE within a range where the effects of the present invention are not impaired.

Examples of the other base oil include a mineral oil or other synthetic oil not corresponding to the aforementioned PVE, PAG, ECP, and POE, such as a polyester, a polycarbonate, an α-olefin oligomer hydride, an alicyclic hydrocarbon compound, and an alkylated aromatic hydrocarbon compound.

Examples of the mineral oil include refined oils obtained by subjecting lubricating oil fractions obtained by atmospherically distilling a paraffinic, intermediate base, or naphthenic crude oil, or vacuum-distilling an atmospheric residual oil obtained by atmospherically distilling crude oil, to at least one of solvent deasphaltation, solvent extraction, hydrocracking, solvent dewaxing, catalytic dewaxing, and hydrorefining; oils produced by isomerizing a mineral oil-based wax; and oils produced by isomerizing GTL WAX (gas-to-liquid wax) which is produced by the Fischer-Tropsch process, or the like.

The mineral oil and other synthetic oil may be used either alone or in combination of two or more thereof.

In the case where the base oil (P) contains the foregoing other base oil, from the viewpoint of providing a refrigerator oil having excellent compatibility with the low HFO-containing refrigerant, the content of the foregoing other base oil is preferably 0% by mass or more and 50% by mass or less, more preferably 0% by mass or more and 30% by mass or less, still more preferably 0% by mass or more and 10% by mass or less, and yet still more preferably 0% by mass or more and 2% by mass or less based on 100% by mass of the whole amount of the base oil (P).

In the refrigerator oil that is one embodiment of the present invention, the content of the base oil (P) is preferably 90% by mass or more and 100% by mass or less, more preferably 95% by mass or more and 100% by mass or less, and still more preferably 97% by mass or more and 100% by mass or less on a basis of the whole amount (100% by mass) of the refrigerator oil.

[Properties of Base Oil (P)]

The hydroxy value of the base oil (P) is 15 mgKOH/g or less.

When the hydroxy value of the base oil (P) is more than 15 mgKOH/g, the compatibility of the refrigerator oil with the low HFO-containing refrigerant and the favorable electrical properties of the resulting refrigerator oil composition are not obtained.

From the foregoing viewpoint, the hydroxy value of the base oil (P) is preferably 10 mgKOH/g or less, more preferably 9 mgKOH/g or less, still more preferably 8 mgKOH/g or less, yet still more preferably 5 mgKOH/g or less, and even yet still more preferably 3 mgKOH/g or less.

The hydroxy value of the base oil (P) is a value measured by the method described in the section of Examples as mentioned later.

On the occasion of synthesizing various base oils, the hydroxy value of the base oil (P) can be, for example, regulated by adjusting the charged amounts of the raw materials and/or a condition of hydrogenation treatment after polymerization.

The kinematic viscosity at 100° C. (hereinafter also referred to as "100° C. kinematic viscosity") of the base oil (P) is preferably 2.0 mm$^2$/s or more and 50.0 mm$^2$/s or less.

When the kinematic viscosity is 2.0 mm$^2$/s or more, the lubricity and the sealing performance become favorable. On the other hand, when the kinematic viscosity is 50.0 mm$^2$/s or less, the compatibility with the low HFO-containing refrigerant becomes favorable.

From the foregoing viewpoint, the 100° C. kinematic viscosity of the base oil (P) is preferably 3.0 mm$^2$/s or more, more preferably 4.0 mm$^2$/s or more, and still more preferably 5.0 mm$^2$/s or more, and it is preferably 40.0 mm$^2$/s or less, more preferably 30.0 mm$^2$/s or less, still more preferably 25.0 mm$^2$/s or less, and yet still more preferably 15.0 mm$^2$/s or less.

The 100° C. kinematic viscosity of the base oil (P) is a value measured by the method described in the section of Examples as mentioned later.

From the viewpoint of safety, the flash point of the base oil (P) is preferably 180° C. or higher. From the foregoing viewpoint, the flash point of the base oil (P) is more preferably 190° C. or higher, and still more preferably 195° C. or higher.

Although an upper limit of the flash point of the base oil (P) is not particularly limited, it is, for example, 300° C. or lower.

The flash point of the base oil (P) is a value measured by the method described in the section of Examples as mentioned later.

<Other Additives>

The refrigerator oil may contain, in addition to the base oil (P), various additives (hereinafter also referred to as "other additives") which a refrigerator oil may contain. As the other additives, at least one additive selected from the group consisting of an antioxidant, an oiliness improver, an extreme pressure agent, an acid scavenger, an oxygen scavenger, a metal deactivator, a rust inhibitor, and an antifoaming agent is exemplified.

In the case where the refrigerator oil contains the foregoing other additives, from the standpoints of effects, economy, and so on, the total content of the foregoing other additives is preferably 0.1% by mass or more, more preferably 0.2% by mass or more, and still more preferably 0.3% by mass or more, and it is preferably 10% by mass or less, more preferably 5% by mass or less, and still more preferably 3% by mass or less, on a basis of the whole amount (100% by mass) of the refrigerator oil.

However, the refrigerator oil may not contain the foregoing other additives.

Examples of the antioxidant include a phenol-based antioxidant and an amine-based antioxidant.

Examples of the phenol-based antioxidant include a monophenol-based antioxidant and a polyphenol-based antioxidant.

Examples of the monophenol-based antioxidant include alkyl-3-(3,5-di-tert-butyl-4-hydroxyphenyl)propionates (examples of the alkyl group include those having 4 or more and 20 or less carbon atoms, and preferably 8 or more and 18 or less carbon atoms), such as n-octyl-3-(3,5-di-tert-butyl-4-hydroxyphenyl)propionate, 6-methylheptyl-3-(3,5-di-tert-butyl-4-hydroxyphenyl)propionate, and n-octadecyl-3-(3,5-di-tert-butyl-4-hydroxyphenyl)propionate; 2,6-di-tert-butyl-4-alkylphenols (the alkyl group has 1 or more and 4 or less carbon atoms), such as 2,6-di-tert-butyl-4-methylphenol and 2,6-di-tert-butyl-4-ethylphenol; 2,4-dimethyl-6-tert-butylphenol, and 2,6-di-tert-amyl-p-cresol.

Examples of the polyphenol-based antioxidant include 4,4'-methylenebis(2,6-di-tert-butylphenol), 4,4'-bis(2,6-di-tert-butylphenol), 4,4'-bis(2-methyl-6-tert-butylphenol), 2,2'-methylenebis(4-ethyl-6-tert-butylphenol), 2,2'-methylenebis(4-methyl-6-tert-butylphenol), 4,4'-butylidenebis(3-methyl-6-tert-butylphenol), 4,4'-isopropylidenebis(2,6-di-tert-butylphenol), 2,2'-methylenebis(4-methyl-6-nonylphenol), 2,2'-isobutylidenebis(4,6-dimethylphenol), 2,2'-methylenebis(4-methyl-6-cyclohexylphenol), 4,4'-thiobis(2-methyl-6-tert-butylphenol), 4,4'-thiobis(3-methyl-6-tert-butylphenol), 2,2'-thiobis(4-methyl-6-tert-butylphenol), bis(3-methyl-4-hydroxy-5-tert-butylbenzyl)sulfide, bis(3,5-di-tert-butyl-4-hydroxybenzyl)sulfide, and thiodiethylenebis [3-(3,5-di-tert-butyl-4-hydroxyphenyl)propionate].

Examples of the amine-based antioxidant include dialkyl diphenylamines, such as 4,4'-dibutyl diphenylamine and 4,4'-dioctyl diphenylamine; phenyl-α-naphthylamines, such as an alkylphenyl-α-naphthylamine and phenyl-α-naphthylamine; and N,N'-diphenyl-p-phenylenediamine.

The refrigerator oil may contain the antioxidant alone or may contain a combination of two or more thereof.

The content of the antioxidant is preferably 0.1% by mass or more, more preferably 0.2% by mass or more, and still more preferably 0.3% by mass or more on a basis of the whole amount (100% by mass) of the refrigerator oil from the viewpoints that an increase of an acid number of the resulting refrigerator oil is suppressed, and that oxidation stability at a high temperature is more easily improved. The foregoing content is preferably 5% by mass or less, more preferably 3% by mass or less, and still more preferably 1% by mass or less from the viewpoint of making it easy to exhibit an effect corresponding to the content.

Examples of the oiliness improver include aliphatic saturated or unsaturated monocarboxylic acids, such as stearic acid and oleic acid; polymerized fatty acids, such as a dimer acid and a hydrogenated dimer acid; hydroxy fatty acids, such as ricinoleic acid and 12-hydroxystearic acid; aliphatic saturated or unsaturated monoalcohols, such as lauryl alcohol and oleyl alcohol; aliphatic saturated or unsaturated monoamines, such as stearylamine and oleylamine; aliphatic saturated or unsaturated monocarboxylic acid amides, such as lauric acid amide and oleic acid amide; and partial esters between a polyhydric alcohol, such as glycerin and sorbitol, and an aliphatic saturated or unsaturated monocarboxylic acid.

The refrigerator oil may contain the oiliness improver alone or may contain a combination of two or more thereof.

The content of the oiliness improver is preferably 0.01% by mass or more, more preferably 0.05% by mass or more, and still more preferably 0.1% by mass or more, and it is preferably 10% by mass or less, more preferably 5% by mass or less, and still more preferably 2% by mass or less, on a basis of the whole amount (100% by mass) of the refrigerator oil.

Examples of the extreme pressure agent include a phosphorus-based extreme pressure agent. Examples of the phosphorus-based extreme pressure agent include a phosphoric acid ester, a phosphorous acid ester, an acidic phosphoric acid ester, an acidic phosphorous acid ester, and amine salts thereof.

Examples of the phosphoric acid ester include a triaryl phosphate, a trialkyl phosphate, a monoalkyl diaryl phosphate, a dialkyl monoaryl phosphate, and a trialkenyl phosphate. The "aryl" mentioned regarding the extreme pressure agent is a concept including not only a functional group composed of only an aromatic ring but also an alkylaryl and an arylalkyl.

Examples of the phosphoric acid ester include triaryl phosphates, such as triphenyl phosphate, tricresyl phosphate, benzyl diphenyl phosphate, cresyl diphenyl phosphate, dicresyl phenyl phosphate, propylphenyl diphenyl phosphate, dipropylphenyl phenyl phosphate, ethylphenyl diphenyl phosphate, diethylphenyl phenyl phosphate, triethylphenyl phosphate, tripropylphenyl phosphate, butylphenyl diphenyl phosphate, dibutylphenyl phenyl phosphate, and tributylphenyl phosphate; alkyl phosphates, such as tributyl phosphate, ethyldibutyl phosphate, trihexyl phosphate, tri (2-ethylhexyl) phosphate, tridecyl phosphate, trilauryl phosphate, trimyristyl phosphate, tripalmityl phosphate, and tristearyl phosphate; ethyl diphenyl phosphate, and trioleyl phosphate.

Examples of the acidic phosphoric acid include various alkyl acid phosphates and dialkyl acid phosphates.

Examples of the phosphorous acid ester include various trialkyl phosphites, triaryl phosphites, monoalkyl diaryl phosphites, dialkyl monoaryl phosphites, and trialkenyl phosphites.

Examples of the acidic phosphorous acid ester include various dialkyl hydrogen phosphites, dialkenyl hydrogen phosphites, and diaryl hydrogen phosphites.

The phosphorus-based extreme pressure agent may also be a sulfur atom-containing phosphoric acid ester, such as trithiophenyl phosphate, or the like. Examples of the amine salt include amine salts of an acidic phosphoric acid ester or an acidic phosphorous acid ester. The amine that forms the amine salt may be a primary, secondary, or tertiary amine.

The refrigerator oil may contain the extreme pressure agent alone or may contain a combination of two or more thereof.

The content of the extreme pressure agent is preferably 0.1% by mass or more, more preferably 0.3% by mass or more, and still more preferably 0.5% by mass or more, and it is preferably 5% by mass or less, more preferably 3% by mass or less, and still more preferably 2% by mass or less, on a basis of the whole amount (100% by mass) of the refrigerator oil.

Examples of the acid scavenger include an epoxy compound. Examples of the epoxy compound include a glycidyl ether compound, cyclohexene oxide, an α-olefin oxide, and epoxidized soybean oil. Of these, a glycidyl ether compound is preferred.

Examples of the glycidyl ether compound include an aliphatic monoalcohol having preferably 3 or more and 30 or less carbon atoms, more preferably 4 or more and 24 or less carbon atoms, and still more preferably 6 or more and 16 or less carbon atoms; an aliphatic polyhydric alcohol having 3 or more and 30 or less carbon atoms, more preferably 4 or more and 24 or less carbon atoms, and still more preferably 6 or more and 16 or less carbon atoms; and an aromatic compound-derived glycidyl ether containing 1 or more hydroxy groups. The aliphatic monoalcohol or the aliphatic polyhydric alcohol may be linear, branched, or cyclic, and it may also be saturated or unsaturated.

In the case of an aliphatic polyhydric alcohol, or in the case of an aromatic compound containing two or more hydroxy groups, it is preferred that all of the hydroxy groups are glycidyl etherified from the viewpoint of stability of the refrigerator oil and suppression of an increase of a hydroxy value.

Examples of the glycidyl ether compound include phenyl glycidyl ether, an alkyl glycidyl ether, and an alkylene glycol glycidyl ether. Examples of the glycidyl ether compound include a glycidyl ether derived from a linear, branched, or cyclic saturated aliphatic monoalcohol having 6 or more and 16 or less carbon atoms (namely, an alkyl glycidyl ether in which an alkyl group thereof has 6 or more and 16 or less carbon atoms). Examples of such a glycidyl ether include 2-ethylhexyl glycidyl ether, isononyl glycidyl ether, decyl glycidyl ether, lauryl glycidyl ether, and myristyl glycidyl ether.

The refrigerator oil may contain the acid scavenger alone or may contain a combination of two or more thereof.

The content of the acid scavenger is preferably 0.1% by mass or more, more preferably 0.4% by mass or more, and still more preferably 0.8% by mass or more on a basis of the whole amount (100% by mass) of the refrigerator oil. The foregoing content is preferably 10% by mass or less, more preferably 5% by mass or less, and still more preferably 3% by mass or less from the viewpoint of making it easy to exhibit an effect corresponding to the content.

Examples of the oxygen scavenger include sulfur-containing aromatic compounds, such as 4,4'-thiobis(3-methyl-6-tert-butylphenol), diphenyl sulfide, dioctyl diphenyl sulfide, a dialkyl diphenylene sulfide, benzothiophene, dibenzothiophene, phenothiazine, benzothiapyran, thiapyran, thianthrene, dibenzothiapyran, and diphenylene disulfide; aliphatic unsaturated compounds, such as various olefins, dienes, and trienes; and terpenes having a double bond.

The refrigerator oil may contain the oxygen scavenger alone or may contain a combination of two or more thereof.

The content of the oxygen scavenger is preferably 0.01% by mass or more, more preferably 0.05% by mass or more, and still more preferably 0.1% by mass or more, and it is preferably 10% by mass or less, more preferably 5% by mass or less, and still more preferably 3% by mass or less, on a basis of the whole amount (100% by mass) of the refrigerator oil.

Examples of the metal deactivator include an N—[N,N'-dialkyl (alkyl group having 3 or more and 12 carbon atoms) aminomethyl]triazole.

Examples of the rust inhibitor include a metal sulfonate, an aliphatic amine, an organic phosphorous acid ester, an organic phosphoric acid ester, an organic sulfonic acid metal salt, an organic phosphoric acid metal salt, an alkenyl succinic acid ester, and a polyhydric alcohol ester.

Examples of the anti-foaming agent include silicone oils, such as dimethyl polysiloxane, and polymethacrylates.

The refrigerator oil may contain the metal deactivator, the rust inhibitor, or the anti-foaming agent, respectively alone or may contain a combination of two or more thereof.

In the case where the refrigerator oil contains the metal deactivator, the rust inhibitor, or the anti-foaming agent, the content of each of them is preferably 0.01% by mass or more, more preferably 0.05% by mass or more, and still more preferably 0.1% by mass or more, and it is preferably 10% by mass or less, more preferably 5% or less, and still more preferably 3% by mass or less, on a basis of the whole amount (100% by mass) of the refrigerator oil.

<Mixed Refrigerant>

The refrigerator oil is a refrigerator oil for a mixed refrigerant (low HFO-containing refrigerant) which contains less than 40% by mass of an unsaturated fluorinated hydrocarbon compound (HFO) on a basis of the whole amount (100% by mass) of the mixed refrigerant.

As mentioned above, as the HFO content in the mixed refrigerant is low, there is a tendency that the compatibility between the refrigerator oil and the mixed refrigerant is worsened.

Accordingly, from the viewpoint of securing a wider temperature region where the refrigerator oil and the mixed refrigerant are able to be compatibilized with each other in the resulting refrigerator oil composition, the HFO content in the mixed refrigerant is preferably 15% by mass or more, more preferably 20% by mass or more, and still more preferably 25% by mass or more on a basis of the whole amount (100% by mass) of the mixed refrigerant.

Meanwhile, the refrigerator oil has excellent compatibility with even a mixed refrigerant having a low HFO content as in the foregoing low HFO-containing refrigerant. Accordingly, in the case where it is intended to control the HFO content in the mixed refrigerant lower, the HFO content in the mixed refrigerant is preferably 37% by mass or less, more preferably 35% by mass or less, still more preferably 32% by mass or less, and yet still more preferably 28% by mass or less on a basis of the whole amount (100% by mass) of the mixed refrigerant.

The mixed refrigerant is hereunder described.

(Unsaturated Fluorinated Hydrocarbon Compound (HFO))

Examples of the unsaturated fluorinated hydrocarbon compound (HFO) include compounds having a carbon-carbon double bond, such as fluorides of a linear or branched chain olefin having 2 or more and 6 or less carbon atoms; and a cyclic olefin having 4 or more and 6 or less carbon atoms.

More specifically, examples thereof include an ethylene having 1 or more and 3 or less (preferably 3) fluorine atoms introduced thereinto; a propene having 1 or more and 5 or less fluorine atoms introduced thereinto; a butene having 1 or more and 7 or less fluorine atoms introduced thereinto; a pentene having 1 or more and 9 or less fluorine atoms introduced thereinto; a hexene having 1 or more and 11 or less fluorine atoms introduced thereinto; a cyclobutene having 1 or more and 5 or less fluorine atoms introduced thereinto; a cyclopentene having 1 or more and 7 or less fluorine atoms introduced thereinto; and a cyclohexene having 1 or more and 9 or less fluorine atoms introduced thereinto.

Of these unsaturated fluorinated hydrocarbon compounds, a fluoride of a propene is preferred; a propene having 3 or more and 5 or less fluorine atoms introduced thereinto is more preferred; and a propene having 4 fluorine atoms introduced thereinto is still more preferred.

Suitable examples of the unsaturated fluorinated hydrocarbon compound include 1,2,3,3,3-pentafluoropropene (R1225ye), 2,3,3,3-tetrafluoropropene (R1234yf), 1,3,3,3-tetrafluoropropene (R1234ze), 1,2,3,3-tetrafluoropropene (R1234yz), 1,1,2-trifluoroethylene (R1123), and (Z)-1,1,1,4,4,4-hexafluoro-2-butene (R1336mzz(Z)). Of these unsaturated fluorinated hydrocarbon compounds, at least one selected from the group consisting of R1234yf, R1234ze, R1123, and R1336mzz(Z) is preferred; at least one selected from the group consisting of R1234yf, R1234ze, and R1336mzz(Z) is more preferred; and at least one selected from the group consisting of R1234yf and R1234ze) is still more preferred.

These unsaturated fluorinated hydrocarbon compounds (HFO's) may be used alone or may be used in combination of two or more thereof. Here, in the case of using a combination of two or more HFO's, examples thereof include a combination of R1234yf and R1234ze.

In the unsaturated fluorinated hydrocarbon compound which the low HFO-containing refrigerant contains, the content of the fluoride of a propene is preferably 50% by mass or more and 100% by mass or less, more preferably 70% by mass or more and 100% by mass or less, still more preferably 90% by mass or more and 100% by mass or less, and yet still more preferably 100% by mass on a basis of the whole amount (100% by mass) of the unsaturated fluorinated hydrocarbon compound.

The low HFO-containing refrigerant is one further containing other refrigerant in addition to the HFO. As the other refrigerant, at least one selected from the group consisting of a saturated fluorinated hydrocarbon compound (HFC) and a natural refrigerant is preferably exemplified; and at least one selected from the group consisting of a saturated fluorinated hydrocarbon compound (HFC), a hydrocarbon-based refrigerant (HC), carbon dioxide ($CO_2$), and ammonia ($NH_3$) is more preferably exemplified.

That is, the low HFO-containing refrigerant is preferably a mixed refrigerant containing less than 40% by mass of the unsaturated fluorinated hydrocarbon compound (HFO) on a basis of the whole amount of the mixed refrigerant and at least one selected from the group consisting of a saturated fluorinated hydrocarbon compound (HFC) and a natural refrigerant; and more preferably a mixed refrigerant containing less than 40% of the unsaturated fluorinated hydrocarbon compound (HFO) on a basis of the whole amount of the mixed refrigerant and at least one selected from the group consisting of a saturated fluorinated hydrocarbon compound (HFC), a hydrocarbon-based refrigerant (HC), carbon dioxide, and ammonia.

(Saturated Fluorinated Hydrocarbon Compound (HFC))

The saturated fluorinated hydrocarbon compound (HFC) is preferably a fluoride of an alkane having 1 or more and 4 or less carbon atoms, more preferably a fluoride of an alkane having 1 or more and 3 or less carbon atoms, and still more preferably a fluoride of an alkane having 1 or 2 carbon atoms (methane or ethane). Examples of the fluoride of methane or ethane include trifluoromethane (R23), difluoromethane (R32), 1,1-difluoroethane (R152a), 1,1,1-trifluoroethane (R143a), 1,1,2-trifluoroethane (R143), 1,1,1,2-tetrafluoroethane (R134a), 1,1,2,2-tetrafluoroethane (R134), and 1,1,1,2,2-pentafluoroethane (R125). Of these saturated fluorinated hydrocarbon compounds, at least one selected from the group consisting of R32, R134a, and R125 is preferred; and R32 is more preferred.

These saturated fluorinated hydrocarbon compounds (HFC's) may be used alone or may be used in combination of two or more thereof. Here, examples of the case of using a combination of two or more thereof include a combination of R32 and R125 and a combination of R32, R125, and R134a, with a combination of R32, R125, and R134a being preferred.

(Natural Refrigerant)

As the natural refrigerant, at least one selected from the group consisting of a hydrocarbon-based refrigerant (H), carbon dioxide ($CO_2$ or carbonic acid gas), and ammonia is exemplified. These natural refrigerants may be used alone or may be used in combination of two or more thereof.

The hydrocarbon-based refrigerant is preferably a hydrocarbon having 1 or more and 8 or less carbon atoms, more preferably a hydrocarbon having 1 or more and 5 or less carbon atoms, and still more preferably a hydrocarbon having 3 or more and 5 or less carbon atoms. When the carbon number is 8 or less, the boiling point of the refrigerant does not become excessively high, and hence, such is preferred as the refrigerant. As the hydrocarbon-based refrigerant, at least one selected from the group consisting of methane, ethane, ethylene, propane (R290), cyclopropane, propylene, n-butane, isobutane (R600a), 2-methylbutane, n-pentane, isopentane, cyclopentane, isobutane, and n-butane is exemplified, and these may be used alone or may be used in combination of two or more thereof.

As the low HFO-containing refrigerant, a mixed refrigerant including less than 40% by mass of the aforementioned unsaturated fluorinated hydrocarbon compound (HFO) on a basis of the whole amount of the mixed refrigerant and the aforementioned saturated hydrocarbon compound (HFC) is yet still more preferably exemplified.

As the suitable mixed refrigerant, a mixed refrigerant containing less than 40% by mass of the aforementioned unsaturated fluorinated hydrocarbon compound (HFO) on a basis of the whole amount of the mixed refrigerant, more than 40% by mass of at least one selected from the group consisting of 1,1,1,2,2-pentafluoroethane (R125) and 1,1,1,2-tetrafluoroethane (R134a) on a basis of the whole amount of the mixed refrigerant, and difluoromethane (R32); or a mixed refrigerant containing less than 40% by mass of the aforementioned unsaturated fluorinated hydrocarbon compound (HFO) on a basis of the whole amount of the mixed refrigerant and 60% by mass or more of difluoromethane (R32) on a basis of the whole amount of the mixed refrigerant is even yet still more preferably exemplified.

As the mixed refrigerant containing less than 40% by mass of the HFO on a basis of the whole amount of the mixed refrigerant, more than 40% by mass of at least one selected from the group consisting of R125 and R134a on a basis of the whole amount of the mixed refrigerant, and R32, a mixed refrigerant containing less than 40% by mass of the HFO on a basis of the whole amount of the mixed refrigerant, more than 40% by mass in total of at least one selected from the group consisting of R125 and R134a on a basis of the whole amount of the mixed refrigerant, and more than 10% by mass of R32 on a basis of the whole amount of the mixed refrigerant is even still more preferably exemplified; and a mixed refrigerant containing less than 40% by mass of the HFO on a basis of the whole amount of the mixed refrigerant, more than 40% by mass in total of at least one selected from the group consisting of R125 and R134a on a basis of the whole amount of the mixed refrigerant, and more than 20% by mass of R32 on a basis of the whole amount of the mixed refrigerant is even still more further preferably exemplified.

As the mixed refrigerant containing less than 40% by mass of the HFO on a basis of the whole amount of the mixed refrigerant and 60% by mass or more of R32 on a basis of the whole amount of the mixed refrigerant, a mixed refrigerant containing less than 40% by mass of the HFO on a basis of the whole amount of the mixed refrigerant and 65% by mass or more of R32 on a basis of the whole amount of the mixed refrigerant is even still more preferably exemplified; and a mixed refrigerant containing less than 40% by mass of the HFO on a basis of the whole amount of the mixed refrigerant and 70% by mass or more of R32 on a basis of the whole amount of the mixed refrigerant is even still more further preferably exemplified.

With respect to the HFO in the mixed refrigerant described as each of the combinations of refrigerants in such a mixed refrigerant (low HFO-containing refrigerant), the suitable embodiments and suitable content of the HFO are the same as those of the embodiments of HFO and the content of HFO in the aforementioned mixed refrigerant.

<Properties of Refrigerator Oil>

The refrigerator oil is excellent in compatibility with the low HFO-containing refrigerant under any of a high-temperature environment and a low-temperature environment.

A two-layer separation temperature at the high-temperature side of the refrigerator oil from the low HFO-containing refrigerant is preferably 35° C. or higher, more preferably 45° C. or higher, still more preferably 50° C. or higher, and yet still more preferably 55° C. or higher.

A two-layer separation temperature at the low-temperature side of the refrigerator oil from the low HFO-containing refrigerant is preferably −15° C. or lower, more preferably −20° C. or lower, still more preferably −30° C. or lower, yet still more preferably −40° C. or lower, and even yet still more preferably −45° C. or lower.

In this specification, the foregoing "two-layer separation temperature at the high-temperature side of the refrigerator oil from the low HFO-containing refrigerant" and "two-layer separation temperature at the low-temperature side of the refrigerator oil from the low HFO-containing refrigerant" each mean a value measured by the method described in the section of Examples as mentioned later.

The volume resistivity of the refrigerator oil composition as a mixture of the low HFO-containing refrigerant and the refrigerator oil, which is measured by the method described in the section of Examples as mentioned later, is preferably $3.0 \times 10^6 \Omega \cdot m$ or more, more preferably $1.0 \times 10^7 \Omega \cdot m$ or more, still more preferably $5.0 \times 10^7 \Omega \cdot m$ or more, yet still more preferably $1.0 \times 10^8 \Omega \cdot m$ or more, and even yet still more preferably $2.0 \times 10^8 \Omega \cdot m$ or more.

[Production Method of Refrigerator Oil]

The production method of the aforementioned refrigerator oil according to an embodiment of the present invention is a method of producing a refrigerator oil, the refrigerator oil being one containing less than 40% by mass of an unsaturated fluorinated hydrocarbon compound (HFO) on a basis of the whole amount of the mixed refrigerant and containing a base oil (P) including at least one selected from the group consisting of a polyvinyl ether (PVE), a polyalkylene glycol (PAG), a copolymer (ECP) of a poly(oxy)alkylene glycol or a monoether thereof and a polyvinyl ether, and a polyol ester (POE), with a hydroxy value of the base oil (P) being 15 mgKOH/g or less.

The foregoing production method is a method of producing a refrigerator oil for a mixed refrigerant (low HFO-containing refrigerant) containing less than 40% by mass of an unsaturated fluorinated hydrocarbon compound (HFO) on a basis of the whole amount of the mixed refrigerant, the refrigerator oil being obtained by blending a base oil (P) including at least one selected from the group consisting of a polyvinyl ether (PVE), a polyalkylene glycol (PAG), a copolymer (ECP) of a poly(oxy)alkylene glycol or a monoether thereof and a polyvinyl ether, and a polyol ester (POE), with a hydroxy value of the base oil (P) being 15 mgKOH/g or less.

In the foregoing production method, the aforementioned other additives may be blended in addition to the base oil (P).

Detailed explanations of the base oil (P) and the other additives are the same as those mentioned above, and hence, the explanations are omitted.

The low HFO-containing refrigerant is also the same as that mentioned above.

[Refrigerator Oil Composition]

The refrigerator oil is one to be used upon mixing with the aforementioned low HFO-containing refrigerant. That is, the refrigerator oil composition according to an embodiment of the present invention contains the low HFO-containing refrigerant and the refrigerator oil. Detailed explanations of the low HFO-containing refrigerant and the refrigerator oil are the same as those mentioned above, and hence, the explanations are omitted.

A content ratio of the refrigerator oil and the low HFO-containing refrigerant ((refrigerator oil)/(low HFO-containing refrigerant)) in the refrigerator oil composition is preferably 1/99 or more and 99/1 or less, more preferably 1/99 or more and 90/10 or less, still more preferably 5/95 or more and 70/30 or less, and yet still more preferably 5/95 or more and 60/40 or less in terms of a mass ratio. By allowing the foregoing mass ratio of the refrigerator oil and the low HFO-containing refrigerant to fall within the foregoing range, it is possible to obtain lubricity and suitable refrigerating capacity in a refrigerator.

The total content of the refrigerator oil and the low HFO-containing refrigerant in the refrigerator oil composition is preferably 90% by mass or more and 100% by mass or less, more preferably 95% by mass or more and 100% by mass or less, still more preferably 98% by mass or more and 100% by mass or less, and yet still more preferably 100% by mass on a basis of the whole amount (100% by mass) of the refrigerator oil composition.

<Properties of Refrigerator Oil Composition>

The composition for refrigerator is excellent in compatibility with the refrigerator oil and the low HFO-containing refrigerant under any of a high-temperature environment and a low-temperature environment.

A two-layer separation temperature at the high-temperature side of the refrigerator oil composition is preferably 35° C. or higher, more preferably 45° C. or higher, still more preferably 50° C. or higher, and yet still more preferably 55° C. or higher.

A two-layer separation temperature at the low-temperature side of the refrigerator oil composition is preferably −15° C. or lower, more preferably −20° C. or lower, still more preferably −30° C. or lower, yet still more preferably −40° C. or lower, and even yet still more preferably −45° C. or lower.

In this specification, the foregoing "two-layer separation temperature at the high-temperature side of the refrigerator oil composition" and "two-layer separation temperature at the low-temperature side of the refrigerator oil composition" each mean a value measured by the method described in the section of Examples as mentioned later.

The foregoing "two-layer separation temperature at the high-temperature side of the refrigerator oil composition" and "two-layer separation temperature at the low-temperature side of the refrigerator oil composition" are the same as the aforementioned "two-layer separation temperature at the high-temperature side of the refrigerator oil from the low HFO-containing refrigerant" and "two-layer separation temperature at the low-temperature side of the refrigerator oil from the low HFO-containing refrigerant", respectively.

From the viewpoint of improving insulation, the volume resistivity of the refrigerator oil composition is preferably $3.0 \times 10^6 \Omega \cdot m$ or more, more preferably $1.0 \times 10^7 \Omega \cdot m$ or more, still more preferably $5.0 \times 10^7 \Omega \cdot m$ or more, yet still more preferably $1.0 \times 10^8 \Omega \cdot m$ or more, and even yet still more preferably $2.0 \times 10^8 \Omega \cdot m$ or more.

[Production Method of Refrigerator Oil Composition]

The refrigerator oil composition is obtained by mixing the aforementioned refrigerator oil and the aforementioned low HFO-containing refrigerant. That is, the production method of the refrigerator oil composition according to an embodiment of the present invention is a method of producing a refrigerator oil composition including a step of mixing the aforementioned refrigerator oil and the aforementioned low HFO-containing refrigerant.

Detailed explanations of the low HFO-containing refrigerant and the refrigerator oil are the same as those mentioned above, and hence, the explanations are omitted.

[Refrigerator]

The aforementioned refrigerator oil or refrigerator oil composition is filled in the interior of the refrigerator and used.

The refrigerator is preferably a compression-type refrigerator using the aforementioned low HFO-containing refrigerant, and more preferably one having a refrigeration cycle including a compressor, a condenser, an expansion mechanism (e.g., an expansion valve), and an evaporator, or having a refrigeration cycle including a compressor, a condenser, an expansion mechanism, a dryer, and an evaporator.

The refrigerator oil is, for example, used for lubricating a sliding portion to be provided in a compressor or the like. The sliding portion is not particularly limited.

All of the refrigerators are ones using the low HFO-containing refrigerant. Although the refrigerator is applied to, for example, a car air conditioner, such as an open-type car air conditioner and an electric car air conditioner, an air conditioner, such as a room air conditioner and a package air conditioner, a gas heat pump (GHP), a refrigeration system, such as a freezer, an icebox, a vending machine, and showcase, a hot water system, such as a water heater and a floor heater, and a heating system, it is preferably applied to an air conditioning application, and more preferably applied to a room air conditioner or a package air conditioner.

EXAMPLES

The present invention is hereunder more specifically described by reference to Examples, but it should be construed that the present invention is by no means limited by these Examples.

Respective physical properties of each refrigerator oil, and each refrigerator oil composition were determined in the following way.

[Hydroxy Value]

Measured through neutralization titration in conformity with JIS K0070:1992.

[100° C. Kinematic Viscosity]

Measured in conformity with JIS K2283:2000.

[Number Average Molecular Weight (Mn)]

Measured with a gel permeation chromatograph (GPC). As for the GPC, one having two columns of "TSKgel SuperMultipore HZ-M", manufactured by Tosoh Corporation successively connected to each other was used; tetrahydrofuran was used as an eluent; the measurement was performed by using a refractive index detector (RI detector) for a detector; and the number average molecular weight (Mn) was determined while using polystyrene as a standard sample.

[Flash Point]

Measured in conformity with JIS K2265-4:2007 (Cleveland Open cup method).

[Refrigerant Compatibility]

A refrigerator oil composition containing 10% by mass of a refrigerator oil on a basis of the whole amount of the refrigerator oil composition and 90% by mass of a mixed refrigerant (low HFO-containing refrigerant) containing less than 40% by mass of an unsaturated fluorinated hydrocarbon compound (HFO) on a basis of the whole amount of the mixed refrigerant [refrigerator oil composition of (refrigerator oil)/(low HFO-containing refrigerant)=10/90 (mass ratio)] was prepared in each of combinations shown in the following Tables 3 to 7.

Using the resulting refrigerator oil composition as an evaluation sample, a two-layer separation temperature at each of the high-temperature side and the low-temperature side was measured by a method mentioned below, thereby evaluating the compatibility of the refrigerator oil with the low HFO-containing refrigerant.

<Two-Layer Separation Temperature at the High-Temperature Side from Low HFO-Containing Refrigerant: Separation Temperature at the High-Temperature Side>

The resulting refrigerator oil composition was charged in a pressure-resistant glass ampule, and the ampule was connected to a vacuum pipe and a refrigerant pipe and then subjected to vacuum deaeration at room temperature (25° C.). Thereafter, the ampule was cooled with liquefied nitrogen, and a predetermined amount of the low HFO-containing refrigerant was collected in the ampule via the refrigerant pipe, followed by sealing the ampule, thereby preparing an ampule having a measurement sample enclosed therein.

Thereafter, the ampule was held in a thermostat; the ampule was irradiated with a laser; the temperature of the thermostat was raised from room temperature (25° C.) to 70° C. at a rate of 1° C./min while measuring a light transmittance of the ampule; and a temperature of the thermostat when the light transmittance of the ampule became 50% of the light transmittance of the ampule at room temperature was designated as a two-layer separation temperature at the high-temperature side of the refrigerator oil as a measurement object from the low HFO-containing refrigerant (in the following Tables 3 to 7, referred to simply as "Separation temperature at the high-temperature side"). It is indicated that the higher the two-layer separation temperature at the high-temperature side of the refrigerator oil from the low HFO-containing refrigerant, the more excellent the compatibility with the low HFO-containing refrigerant at a high temperature.

A refrigerator oil composition which did not cause the two-layer separation until at 70° C. is expressed as "70 or higher" in the following Tables 3 to 7.

A refrigerator oil composition which already caused the two-layer separation at a point of time of 25° C. is expressed as "Separated" in the following Tables 3 to 7.

<Two-Layer Separation Temperature at the Low-Temperature Side from Low HFO-Containing Refrigerant: Separation Temperature at the Low-Temperature Side>

A two-layer separation temperature at the low-temperature side (in the following Tables 3 to 7, referred to simply as "Separation temperature at the low-temperature side") was measured adopting the same method as the measurement method of the two-layer separation temperature at the high-temperature side from the low HFO-containing refrigerant, except that at the time of measurement, the ampule was cooled from room temperature at a rate of −1° C./min. It is indicated that the lower the two-layer separation temperature at the low-temperature side of the refrigerator oil from the low HFO-containing refrigerant, the more excellent the compatibility with the low HFO-containing refrigerant at a low temperature.

A refrigerator oil composition which did not cause the two-layer separation until at −50° C. is expressed as "−50 or lower" in the following Tables 3 to 7.

A refrigerator oil composition which already caused the two-layer separation at a point of time of 25° C. is expressed as "Separated" in the following Tables 3 to 7.

[Electrical Properties]

A refrigerator oil composition containing 50% by mass of a refrigerant oil and 50% by mass of a low HFO-containing refrigerant on a basis of the whole amount of the refrigerator oil composition [refrigerator oil composition of (refrigerator oil)/(low HFO-containing refrigerant)=50/50 (mass ratio)] was prepared in each of combinations shown in the following Tables 3 to 7.

Using the resulting refrigerator oil composition as an evaluation sample, a volume resistivity was measured by a method mentioned below, thereby evaluating the electrical properties. It is indicated that the higher the volume resistivity, the more excellent the insulation.

<Volume Resistivity>

Measured in conformity with JIS C2101:2010.

Physical properties of the base oil (P) which the refrigerator oil composition shown in each of Tables 3 to 7 as evaluated in the respective Examples and respective Comparative Examples and the composition of the low HFO-containing refrigerant used on the occasion of preparing the refrigerator oil composition in the evaluation of the aforementioned properties are shown in the Tables 1 and 2, respectively.

TABLE 1

|     |        | Base oil (P) | Hydroxy value (mgKOH/g) | 100° C. kinematic viscosity (mm²/g) | Number average molecular weight (Mn) | Flash point (° C.) |
|-----|--------|--------------|-------------------------|--------------------------------------|--------------------------------------|---------------------|
| PVE | PVE-A1 | Polyethyl vinyl ether | 2 | 9.2 | 860 | 200 |
|     | PVE-A2 | Polyethyl vinyl ether | 28 | 8.5 | 650 | 198 |
|     | PVE-B1 | Polyethyl vinyl ether/polyisobutyl vinyl ether copolymer (mass ratio: 9/1) | 7 | 7.9 | 665 | 196 |
|     | PVE-B2 | Polyethyl vinyl ether/polyisobutyl vinyl ether copolymer (mass ratio: 9/1) | 19 | 10.2 | 760 | 199 |
| PAG | PAG-1 | Polyoxypropylene glycol dimethyl ether | 1 | 10.3 | 1020 | 221 |
|     | PAG-2 | Polyoxypropylene glycol dimethyl ether | 33 | 9.5 | 870 | 199 |
| ECP | ECP-1 | Polypropylene glycol/polyethyl vinyl ether copolymer (mass ratio: 5/5) | 8 | 10.6 | 860 | 216 |
|     | ECP-2 | Polypropylene glycol/polyethyl vinyl ether copolymer (mass ratio: 5/5) | 27 | 10.0 | 750 | 210 |
| POE | POE-1 | Ester of pentaerythritol with octanoic acid and nonanoic acid (octanoic acid/nonanoic acid = 1/1 (molar ratio)) | 4 | 8.5 | 670 | 265 |
|     | POE-2 | Ester of pentaerythritol with octanoic acid and nonanoic acid (octanoic acid/nonanoic acid = 1/1 (molar ratio)) | 23 | 8.9 | 665 | 266 |

TABLE 2

| Kind of refrigerant | | Low HFO-containing refrigerant No. 1 | Low HFO-containing refrigerant No. 2 | Low HFO-containing refrigerant No. 3 |
|---|---|---|---|---|
| HFO | R1234yf | 25 | 25 | 20 |
| | R1234ze | — | — | 15 |
| HFC | R32 | 75 | 25 | 23 |
| | R125 | — | 25 | 22 |
| | R134a | — | 25 | 20 |
| HFO total content | | 25 | 25 | 35 |

*: The value in the table expresses the content (% by mass) of each refrigerant in the low HFO-containing refrigerant Examples 1 to 15

A refrigerator oil composition was prepared by mixing the refrigerator oil containing 100% by mass of the base oil (P) and the low HFO-containing refrigerant shown in each of the aforementioned Tables 1 and 2 were mixed in a combination shown in each of the following Tables 3 to 7 and evaluated according to the aforementioned evaluation methods. The obtained results are shown in the following Tables 3 to 7, respectively.

Comparative Examples 1 to 15

A refrigerator oil composition was prepared by mixing the refrigerator oil containing 100% by mass of the base oil (P) and the low HFO-containing refrigerant shown in each of the aforementioned Tables 1 and 2 were mixed in a combination shown in each of the following Tables 3 to 7 and evaluated according to the aforementioned evaluation methods. The obtained results are shown in the following Tables 3 to 7, respectively.

TABLE 3

| | | Example 1 | Example 2 | Example 3 | Comparative Example 1 | Comparative Example 2 | Comparative Example 3 |
|---|---|---|---|---|---|---|---|
| Refrigerator oil | | | PVE-A1 | | | PVE-A2 | |
| Low HFO-containing refrigerant No. | | 1 | 2 | 3 | 1 | 2 | 3 |
| Refrigerant compatibility | Separation temperature at the high-temperature side [° C.] | 58 | 70 or higher | 70 or higher | 45 | 70 or higher | 70 or higher |
| | Separation temperature at the low-temperature side [° C.] | −48 | −50 or lower | −50 or lower | −25 | −45 | −50 or lower |
| Electrical properties | Volume resistivity [Ω · m] | $8.0 \times 10^7$ | $2.0 \times 10^8$ | $2.5 \times 10^8$ | $7.0 \times 10^6$ | $1.0 \times 10^7$ | $1.1 \times 10^7$ |

TABLE 4

| | | Example 4 | Example 5 | Example 6 | Comparative Example 4 | Comparative Example 5 | Comparative Example 6 |
|---|---|---|---|---|---|---|---|
| Refrigerator oil | | | PVE-B1 | | | PVE-B2 | |
| Low HFO-containing refrigerant No. | | 1 | 2 | 3 | 1 | 2 | 3 |
| Refrigerant compatibility | Separation temperature at the high-temperature side [° C.] | 55 | 70 or higher | 70 or higher | 42 | 70 or higher | 70 or higher |
| | Separation temperature at the low-temperature side [° C.] | −30 | −50 or lower | −50 or lower | −5 | −40 | −45 |
| Electrical properties | Volume resistivity [Ω · m] | $9.0 \times 10^7$ | $3.0 \times 10^8$ | $4.5 \times 10^8$ | $9.0 \times 10^6$ | $2.0 \times 10^7$ | $2.0 \times 10^7$ |

TABLE 5

|  |  | Example 7 | Example 8 | Example 9 | Comparative Example 7 | Comparative Example 8 | Comparative Example 9 |
|---|---|---|---|---|---|---|---|
| Refrigerator oil |  |  | PAG-1 |  |  | PAG-2 |  |
| Low HFO-containing refrigerant No. |  | 1 | 2 | 3 | 1 | 2 | 3 |
| Refrigerant compatibility | Separation temperature at the high-temperature side [° C.] | 25 | n.d. | n.d. | Separated | n.d. | n.d. |
|  | Separation temperature at the low-temperature side [° C.] | −20 | n.d. | n.d. | Separated | n.d. | n.d. |
| Electrical properties | Volume resistivity [Ω · m] | $5.0 \times 10^6$ | $7.0 \times 10^6$ | $9.0 \times 10^6$ | $1.0 \times 10^5$ | $4.0 \times 10^5$ | $7.0 \times 10^5$ |

*: n.d.: Unmeasured

TABLE 6

|  |  | Example 10 | Example 11 | Example 12 | Comparative Example 10 | Comparative Example 11 | Comparative Example 12 |
|---|---|---|---|---|---|---|---|
| Refrigerator oil |  |  | ECP-1 |  |  | ECP-2 |  |
| Low HFO-containing refrigerant No. |  | 1 | 2 | 3 | 1 | 2 | 3 |
| Refrigerant compatibility | Separation temperature at the high-temperature side [° C.] | 35 | 70 or higher | 70 or higher | Separated | 70 or higher | 70 or higher |
|  | Separation temperature at the low-temperature side [° C.] | −25 | −25 | −35 | Separated | 0 | −10 |
| Electrical properties | Volume resistivity [Ω · m] | $9.0 \times 10^6$ | $3.0 \times 10^7$ | $4.5 \times 10^7$ | $5.0 \times 10^5$ | $9.0 \times 10^5$ | $1.0 \times 10^6$ |

TABLE 7

|  |  | Example 13 | Example 14 | Example 15 | Comparative Example 13 | Comparative Example 14 | Comparative Example 15 |
|---|---|---|---|---|---|---|---|
| Refrigerator oil |  |  | POE-1 |  |  | POE-2 |  |
| Low HFO-containing refrigerant No. |  | 1 | 2 | 3 | 1 | 2 | 3 |
| Refrigerant compatibility | Separation temperature at the high-temperature side [° C.] | 45 | 50 | 55 | Separated | 46 | 50 |
|  | Separation temperature at the low-temperature side [° C.] | −15 | −20 | −30 | Separated | −10 | −15 |
| Electrical properties | Volume resistivity [Ω · m] | $9.0 \times 10^7$ | $2.0 \times 10^8$ | $3.0 \times 10^8$ | $9.0 \times 10^6$ | $1.0 \times 10^7$ | $2.0 \times 10^7$ |

As shown in Tables 3 to 7, it was confirmed that the compositions for refrigerators of Examples 1 to 15 each using the refrigerator oil containing 100% by mass of the base oil (P) having a hydroxy value of 15 mgKOH/g or less are not only excellent in compatibility with each of the mixed refrigerants containing less than 40% by mass of the unsaturated fluorinated hydrocarbon compound (HFO) on a basis of the whole amount of the mixed refrigerant but also excellent in electrical properties, as compared with the compositions for refrigerators of Comparative Examples 1 to 15 each using the refrigerator oil containing 100% by mass of the base oil having the same molecular structure and having a hydroxy value of more than 15 mgKOH/g.

INDUSTRIAL APPLICABILITY

The refrigerator oil that is an embodiment of the present invention is excellent in compatibility with a mixed refrigerant containing less than 40% by mass of the unsaturated fluorinated hydrocarbon compound (HFO) on a basis of the whole amount of the mixed refrigerant. In consequence, the refrigerator oil is one which is suitably used as a refrigerator oil to be blended in the refrigerator oil composition using the foregoing mixed refrigerant, and it is more preferably applied for an air conditioning application, and still more preferably applied for room air conditioners or package air conditioners.

Furthermore, the aforementioned refrigerator oil that is an embodiment of the present invention is able to provide a refrigerator oil composition with excellent electrical properties, and therefore, for example, it is one which is more suitably used as a refrigerator oil of a closed type compression-type refrigerator using the aforementioned mixed refrigerant.

The invention claimed is:

1. A refrigerator oil composition consisting of a mixed refrigerant and a refrigerator oil, wherein the mixed refrigerant consists of from 20% to 37% by mass of an unsaturated fluorinated hydrocarbon compound (HFO) based on a total amount of the mixed refrigerant, more than 40% to less than 60% by mass of at least one selected from the group consisting of 1,1,1,2,2-pentafluoroethane (R125) and 1,1,1,2-tetmfluoroethane (R134a) on based on the total amount of the mixed refrigerant, and more than 20% to less than 40% by mass of difluoromethane (R32) based on the total amount of the mixed refrigerant, wherein the unsaturated fluorinated hydrocarbon compound (HFO) is at least one selected from the group consisting of 2,3,3,3-tetrafluoropropene (R1234yf) and 1,3,3,3-tetrafluoropropene (R1234ze), the refrigerator oil consists of a base oil (P) consisting of at least one selected from the group consisting of a polyvinyl ether (PVE) and a polyol ester (POE), wherein a hydroxy value of the base oil (P) is 15 mgKOH/g or less, wherein the two-layer separation temperature at the high-temperature side of the refrigerator oil is 50° C. or higher, and the two-layer separation temperature at the low-temperature side of the refrigerator oil is −20° C. or lower, and wherein a volume resistivity of the refrigerator oil composition is $2.0 \times 10^8 \Omega \cdot m$ or more.

2. The refrigerator oil composition according to claim 1, wherein the hydroxy value of the base oil (P) is 10 mgKOH/g or less.

\* \* \* \* \*